(12) United States Patent
Huang et al.

(10) Patent No.: US 11,082,876 B2
(45) Date of Patent: Aug. 3, 2021

(54) METHOD AND APPARATUS OF TRANSMITTING DEVICE-TO-DEVICE CHANNEL MEASUREMENT IN A WIRELESS COMMUNICATION SYSTEM

(71) Applicant: ASUSTek Computer Inc., Taipei (TW)

(72) Inventors: Chun-Wei Huang, Taipei (TW); Ming-Che Li, Taipei (TW); Yi-Hsuan Kung, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 17/024,464

(22) Filed: Sep. 17, 2020

(65) Prior Publication Data

US 2021/0099901 A1   Apr. 1, 2021

Related U.S. Application Data

(60) Provisional application No. 62/907,034, filed on Sep. 27, 2019.

(51) Int. Cl.
   *H04W 24/10* (2009.01)
   *H04B 7/06* (2006.01)
   (Continued)

(52) U.S. Cl.
   CPC .......... *H04W 24/10* (2013.01); *H04B 7/0626* (2013.01); *H04L 1/1812* (2013.01);
   (Continued)

(58) Field of Classification Search
   CPC ..... H04W 24/10; H04W 24/08; H04W 72/10; H04W 72/12; H04L 1/1812; H04L 5/0048; H04B 7/0626
   See application file for complete search history.

(56) References Cited

U.S. PATENT DOCUMENTS

| | | |
|---|---|---|
| 9,143,973 B2 | 9/2015 | Choudhury et al. |
| 2018/0175993 A1* | 6/2018 | Onggosanusi ........ H04W 72/06 |

(Continued)

FOREIGN PATENT DOCUMENTS

| | | |
|---|---|---|
| WO | 2019/104014 | 5/2019 |
| WO | 2020/064538 | 4/2020 |

OTHER PUBLICATIONS

European Search Report from corresponding EP Application No. 20196604.1, dated Dec. 18, 2020.

(Continued)

*Primary Examiner* — Chi Ho A Lee
(74) *Attorney, Agent, or Firm* — Blue Capital Law Firm, P.C.

(57) ABSTRACT

A method and apparatus are disclosed from the perspective of a second User Equipment (UE) for performing sidelink transmission to a first UE. In one embodiment, the method includes the second UE generating a MAC (Medium Access Control) CE (Control Element) with a fixed or (pre-defined) priority value, wherein the MAC CE is for transmitting to the first UE. The method further includes the second UE generating a MAC PDU (Protocol Data Unit) comprising the MAC CE and sidelink data from one or more sidelink logical channels, wherein the sidelink data is available for transmitting to the first UE. Furthermore, the method includes the second UE setting a priority field in a first SCI to a fixed or (pre-defined) priority value of the MAC CE. In addition, the method includes the second UE transmitting the first SCI to the first UE, wherein the first SCI schedules a first sidelink transmission for transmitting the MAC PDU.

16 Claims, 17 Drawing Sheets

(51) Int. Cl.
    *H04L 1/18*     (2006.01)
    *H04L 5/00*     (2006.01)
    *H04W 24/08*     (2009.01)
    *H04W 72/10*     (2009.01)
    *H04W 72/12*     (2009.01)
    *H04W 80/02*     (2009.01)

(52) U.S. Cl.
    CPC ........... *H04L 5/0048* (2013.01); *H04W 24/08* (2013.01); *H04W 72/10* (2013.01); *H04W 72/12* (2013.01); *H04W 80/02* (2013.01)

(56) References Cited

U.S. PATENT DOCUMENTS

| | | | |
|---|---|---|---|
| 2018/0263026 A1 | 9/2018 | Loehr et al. | |
| 2019/0363843 A1* | 11/2019 | Gordaychik | H04W 72/042 |
| 2020/0106566 A1* | 4/2020 | Yeo | H04W 28/04 |
| 2020/0267753 A1* | 8/2020 | Adjakple | H04W 72/1226 |
| 2020/0304272 A1* | 9/2020 | Lee | H04W 72/1263 |
| 2020/0313804 A1* | 10/2020 | Ryu | H04L 1/1861 |
| 2020/0322024 A1* | 10/2020 | Cheng | H04L 25/0226 |
| 2020/0337083 A1* | 10/2020 | Loehr | H04W 72/14 |
| 2020/0344722 A1* | 10/2020 | He | H04W 72/0446 |
| 2020/0344771 A1* | 10/2020 | Kang | H04W 72/10 |
| 2020/0359394 A1* | 11/2020 | Wu | H04W 72/1205 |

OTHER PUBLICATIONS

LG Electronics, "5G V2X with NR sidelink", 3GPP Draft; RP-190983, SR for 5GV2X, 3rd Generation Partnership Project (3GPP), Mobile Competence Centre; 650, Route Des Lucioles; F-06921 Sophia-Antipolis Cedex, France vol. TSG RAN no. Newport Beach, USA; Jun. 3, 2019-Jun. 6, 2019, Jun. 2, 2019. XP051747190.

\* cited by examiner

| DCI format | Search Space |
|---|---|
| DCI format 5A | For PDCCH: Common and UE specific by C-RNTI<br>For EPDCCH: UE specific by C-RNTI |

FIG. 5 (PRIOR ART)

| SL index field in DCI format 5A | Indicated value $m$ |
|---|---|
| '00' | 0 |
| '01' | 1 |
| '10' | 2 |
| '11' | 3 |

FIG. 6 (PRIOR ART)

| Resource reservation field in SCI format 1 | Indicated value X | Condition |
|---|---|---|
| '0001', '0010', ..., '1010' | Decimal equivalent of the field | The higher layer decides to keep the resource for the transmission of the next transport block and the value X meets $1 \leq X \leq 10$. |
| '1011' | 0.5 | The higher layer decides to keep the resource for the transmission of the next transport block and the value X is 0.5. |
| '1100' | 0.2 | The higher layer decides to keep the resource for the transmission of the next transport block and the value X is 0.2. |
| '0000' | 0 | The higher layer decides not to keep the resource for the transmission of the next transport block. |
| '1101', '1110', '1111' | Reserved | |

FIG. 7 (PRIOR ART)

| Fields | Num bits | Comments |
|---|---|---|
| #Slots | 3 | Indicated the #slots aggregated for this transmission |
| Joint time frequency resource reservation for retransmission | 9 | Time-frequency resources used by SCH + CCH-2, and additionally the future time-frequency resources being reserved for retransmission |
| Periodicity If same resource is reserved for future periodic Tx | 4 | If periodic traffic |
| QoS (Only Priority) | 3 | Priority information |
| Control Exclusion distance | 4 | Exclusion region to follow for reserved resources |
| CCH-2 format indicator + CCH-2/SCH rate offset | 4 | |
| DMRS Pattern | 2 | Potentially more #bits if dynamic selection of Type 1 and Type 2 is supported |
| MCS | 5 | |
| TM (rank, layers: (a) single port, (b) rank-2, etc.) | 2 | |
| CRC | 24 | |
| Total #bits | 51 | |

FIG. 9 (PRIOR ART)

| Fields | Num bits | Comments |
|---|---|---|
| CCH-2 Format 1 (for broadcast) | | |
| Layer-1 source ID | 8 | Note: Rx UEs does HARQ combining based on source ID and destination ID (to determine the same link), HARQ ID/NDI/RV |
| Layer-1 destination ID | 8 | |
| HARQ process ID | 3 | |
| NDI | 1 | |
| RV ID | 2 | |
| CRC | 24 | |
| | | |
| Total bits: | 46 | |
| CCH-2 Format 2 (for multicast) | | |
| Layer-1 source ID | 8 | Note: Rx UEs does HARQ combining based on source ID and destination ID (to determine the same link), HARQ ID/NDI/RV |
| Layer-1 destination ID | 8 | |
| HARQ process ID | 3 | |
| NDI | 1 | |
| RV ID | 2 | |
| Zone ID for Distance based NACK | 10 | For multicast NACK functionality |
| NACK distance | 1 | For multicast NACK functionality |
| HARQ ACK/NACK feedback needed | 5 | For multicast NACK functionality |
| CRC | 24 | |
| | | |
| Total bits: | 62 | |
| CCH-2 Format 3 (for unicast) | | |
| Layer-1 source ID | 8 | Note: Rx UEs does HARQ combining based on source ID and destination ID (to determine the same link), HARQ ID/NDI/RV |
| Layer-1 destination ID | 8 | |
| HARQ process ID | 3 | |
| NDI | 1 | |
| RV ID | 2 | |
| HARQ ACK/NACK feedback needed | 1 | |
| CSI-RS configuration | 2 | |
| OLPC reference Tx power | 4 | For open loop power control |
| CRC | 24 | |
| | | |
| Total bits: | 53 | |

FIG. 10 (PRIOR ART)

| | CSI report presence | Resource allocation | MCS | Beta indicator/offset for second stage/2nd SCI | RV | HARQ Process number |
|---|---|---|---|---|---|---|
| TB only | No | Any | Any | Any | Any | Any |
| TB+CSI report | Yes | Any | Any | Any (also for CSI) | Any | Any |
| CSI report only | Yes | 1 | Specific value | Any (not for CSI) | Specific value | Specific value |

FIG. 11

| | Beta indication/offset for second stage/$2^{nd}$ SCI | Beta indication/offset for CSI report |
|---|---|---|
| 1 | 1 | 1 |
| 2 | 0.75 | 0.5 |
| 3 | 0.6 | 0.4 |
| 4 | 0.6 | reserved |

METHOD AND APPARATUS OF TRANSMITTING DEVICE-TO-DEVICE CHANNEL MEASUREMENT IN A WIRELESS COMMUNICATION SYSTEM

CROSS-REFERENCE TO RELATED APPLICATIONS

The present Application claims the benefit of U.S. Provisional Patent Application Ser. No. 62/907,034 filed on Sep. 27, 2019, the entire disclosure of which is incorporated herein in their entirety by reference.

FIELD

This disclosure generally relates to wireless communication networks, and more particularly, to a method and apparatus of transmitting device-to-device channel measurement in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a second User Equipment (UE) for performing sidelink transmission to a first UE. In one embodiment, the method includes the second UE generating a MAC (Medium Access Control) CE (Control Element) with a fixed or (pre-defined) priority value, wherein the MAC CE is for transmitting to the first UE. The method further includes the second UE generating a MAC PDU (Protocol Data Unit) comprising the MAC CE and sidelink data from one or more sidelink logical channels, wherein the sidelink data is available for transmitting to the first UE. Furthermore, the method includes the second UE setting a priority field in a first SCI to a fixed or (pre-defined) priority value of the MAC CE. In addition, the method includes the second UE transmitting the first SCI to the first UE, wherein the first SCI schedules a first sidelink transmission for transmitting the MAC PDU.

BRIEF DESCRIPTION OF THE DRAWINGS

FIG. 5 is a reproduction of Table 14.2-2 of 3GPP TS 36.213 V15.4.0.

FIG. 6 is a reproduction of Table 14.2.1-1 of 3GPP TS 36.213 V15.4.0.

FIG. 7 is a reproduction of Table 14.2.1-2 of 3GPP TS 36.213 V15.4.0.

FIG. 9 is a reproduction of Table 4 of 3GPP R1-1909252.

FIG. 10 is a reproduction of Table 5 of 3GPP R1-1909252.

FIG. 11 is a table according to one exemplary embodiment.

FIG. 12 is a table according to one exemplary embodiment.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 36.213 V15.4.0 (2018-12), "E-UTRA; Physical layer procedures (Release 15)"; TS 36.212 V15.4.0 (2018-12), "E-UTRA); Physical layer; Multiplexing and channel coding (Release 15)"; TS 36.211 V15.4.0 (2018-12), "E-UTRA); Physical layer; Physical channels and modulation (Release 15)"; TS 36.214 V15.3.0 (2018-09), "E-UTRA); Physical layer; Measurements (Release 15)"; RP-182111, "Revised SID: Study on NR V2X", LG Electronics; R1-1810051, "Final Report of 3GPP TSG RAN WG1 #94 v1.0.0 (Gothenburg, Sweden, 20-24 Aug. 2018)"; R1-1812101, "Final Report of 3GPP TSG RAN WG1 #94bis v1.0.0 (Chengdu, China, 8-12 Oct. 2018)"; R1-1901482, "Final Report of 3GPP TSG RAN WG1 #95 v0.1.0 (Spokane, USA, 12-16 Nov. 2018)"; R1-1901483, "Final Report of 3GPP TSG RAN WG1 #AH_1901 v1.0.0 (Taipei, Taiwan, 21-25 Jan. 2019)"; R1-1905837, "Final Report of 3GPP TSG RAN WG1 #96 v2.0.0 (Athens, Greece, 25 Feb.-1 Mar. 2019)"; R1-1905921, "Final Report of 3GPP TSG RAN WG1 #96bis v1.0.0 (Xi'an, China, 8-12 Apr. 2019)"; Draft Report of 3GPP TSG RAN WG1 #97 v0.1.0 (Reno, USA, 13-17 May 2019); Draft Report of 3GPP TSG RAN WG1 #98 v0.1.0 (Prague, Czech, 26-30 Aug. 2019); R1-1908917, "PHY layer procedures for NR sidelink", Ericsson; R1-1908223, "Discussion on physical layer procedure for NR V2X", Fujitsu; R1-1908906, "Discussion on physical layer procedures for NR sidelink", LG Electronics; R1-1908481, "On Physical Layer Procedures for NR V2X", Samsung; R1-1909252, "Considerations on Physical Layer aspects of NR V2X", Qualcomm Incorporated; TS 36.321 V15.6.0, "EUTRA, Medium Access Control (MAC) protocol specification (Release 15)"; and TS 38.321 V15.6.0, "NR; Medium Access Control (MAC) protocol specification (Release 15)". The standards and documents listed above are hereby expressly incorporated by reference in their entirety.

Figure 1:
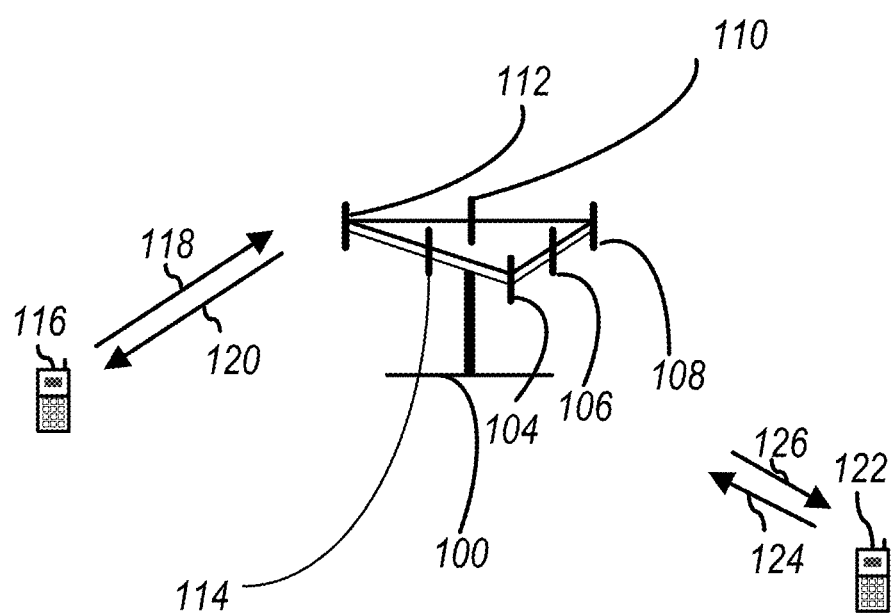
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
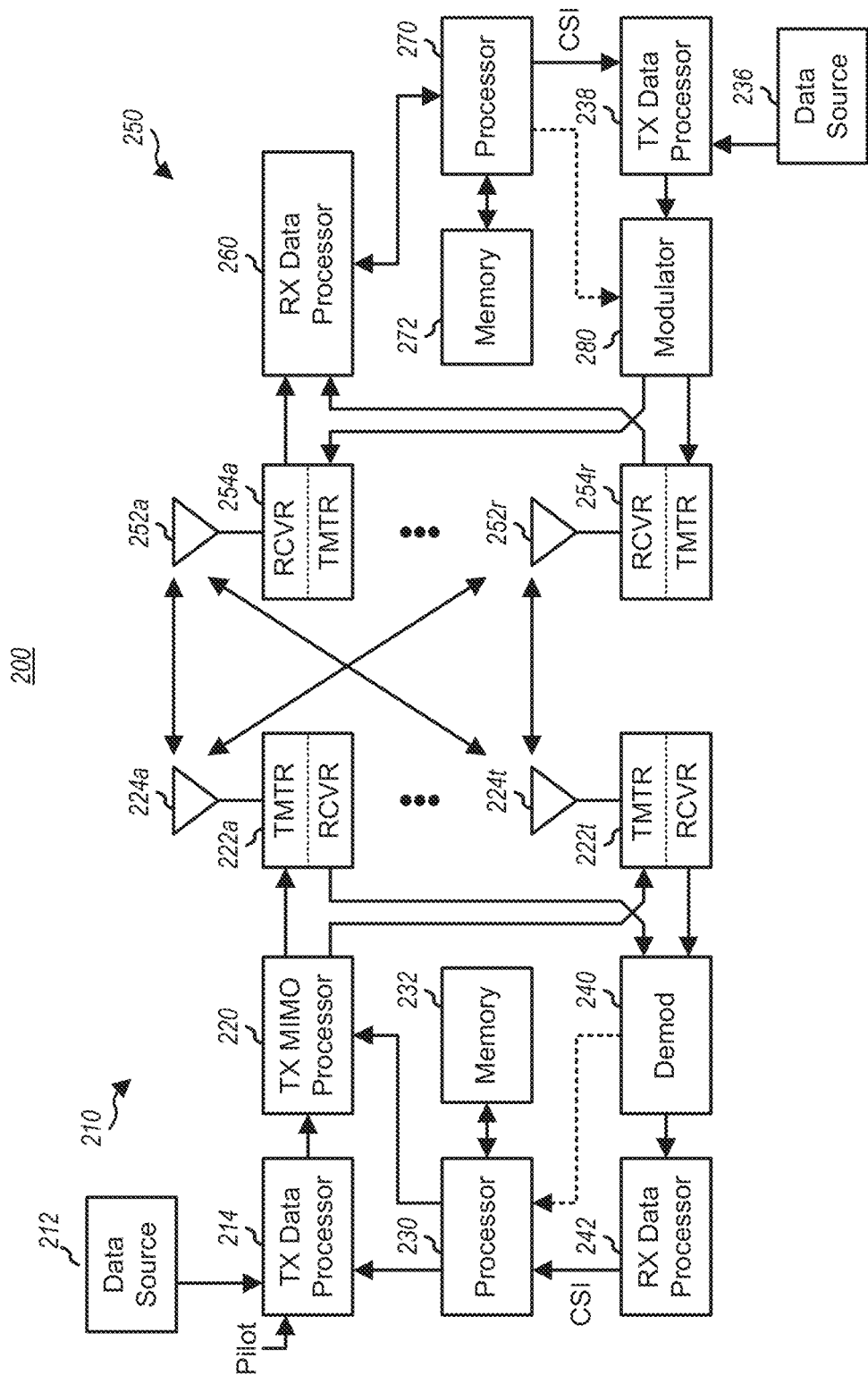
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
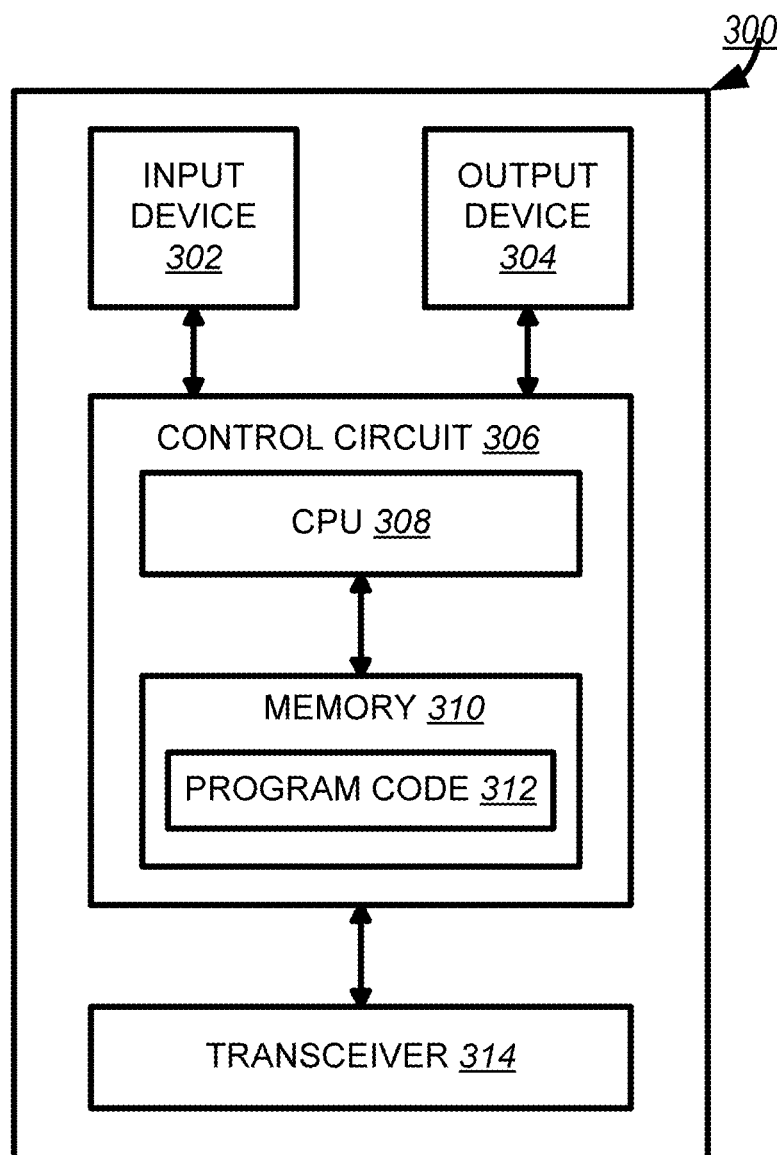
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
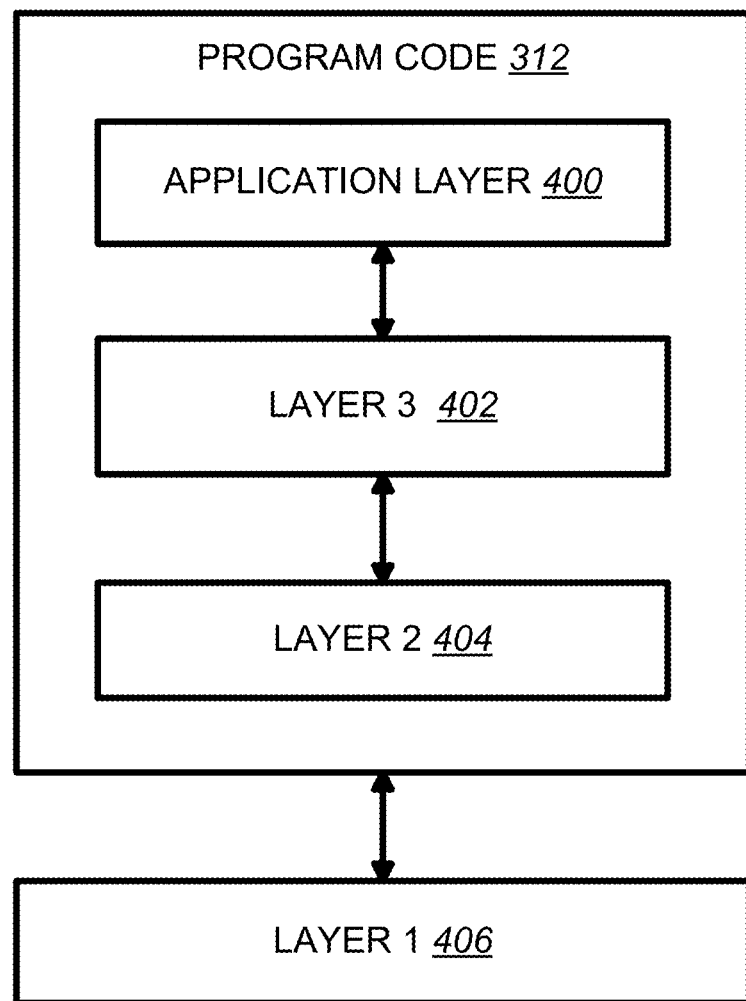
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 36.213 specifies the UE procedure for V2X (Vehicle-to-Everything) transmission in LTE/LTE-A as provided below. The V2X transmissions are performed as sidelink transmission mode 3 or sidelink transmission mode 4.

14 UE Procedures Related to Sidelink
14.1 Physical Sidelink Shared Channel Related Procedures
14.1.1 UE Procedure for Transmitting the PSSCH
If the UE transmits SCI format 1 on PSCCH according to a PSCCH resource configuration in subframe n, then for the corresponding PSSCH transmissions of one TB
  for sidelink transmission mode 3,
    the set of subframes and the set of resource blocks are determined using the subframe pool indicated by the PSSCH resource configuration (described in Subclause 14.1.5) and using "Retransmission index and Time gap between initial transmission and retransmission" field and "Frequency resource location of the initial transmission and retransmission" field in the SCI format 1 as described in Subclause 14.1.1.4A.
  for sidelink transmission mode 4,
    the set of subframes and the set of resource blocks are determined using the subframe pool indicated by the PSSCH resource configuration (described in Subclause 14.1.5) and using "Retransmission index and Time gap between initial transmission and retransmission" field and "Frequency resource location of the initial transmission and retransmission" field in the SCI format 1 as described in Subclause 14.1.1.4B.

14.1.1.6 UE Procedure for Determining the Subset of Resources to be Reported to Higher Layers in PSSCH Resource Selection in Sidelink Transmission Mode 4 and in Sensing Measurement in Sidelink Transmission Mode 3

In sidelink transmission mode 4, when requested by higher layers in subframe n for a carrier, the UE shall determine the set of resources to be reported to higher layers for PSSCH transmission according to the steps described in this Subclause. Parameters $L_{subCH}$ the number of sub-channels to be used for the PSSCH transmission in a subframe, $P_{rsvp\_TX}$ the resource reservation interval, and $prio_{TX}$ the priority to be transmitted in the associated SCI format 1 by the UE are all provided by higher layers (described in [8]). $C_{resel}$ is determined according to Subclause 14.1.1.4B.

In sidelink transmission mode 3, when requested by higher layers in subframe n for a carrier, the UE shall determine the set of resources to be reported to higher layers in sensing measurement according to the steps described in this Subclause. Parameters $L_{subCH}$, $P_{rsvp\_TX}$ and $prio_{TX}$ are all provided by higher layers (described in [11]). $C_{resel}$ is determined by $C_{resel}=10*SL\_RESOURCE\_RESELECTION\_COUNTER$, where SL_RESOURCE_RESELECTION_COUNTER is provided by higher layers [11].

If partial sensing is not configured by higher layers then the following steps are used:
  1) A candidate single-subframe resource for PSSCH transmission $R_{x,y}$ is defined as a set of $L_{subCH}$ contiguous sub-channels with sub-channel x+j in subframe $t_y^{SL}$ where j=0, . . . , $L_{subCH}-1$. The UE shall assume that any set of $L_{subCH}$ contiguous sub-channels included in the corresponding PSSCH resource pool (described in 14.1.5) within the time interval [n+$T_1$, n+$T_2$] corresponds to one candidate single-subframe resource, where selections of $T_1$ and $T_2$ are up to UE implementations under $T_1 \leq 4$ and $T_{2min}(prio_{TX}) \leq T_2 \leq 100$, if $T_{2min}(prio_{TX})$ is provided by higher layers for $prio_{TX}$, otherwise $20 \leq T_2 \leq 100$. UE selection of $T_2$ shall fulfil the latency requirement. The total number of the candidate single-subframe resources is denoted by $M_{total}$.
  2) The UE shall monitor subframes $t_{n'-10 \times P_{step}}^{SL}$, $t_{n'-10 \times P_{step}+1}^{SL}$, . . . , $t_{n'-1}^{SL}$ except for those in which its transmissions occur, where $t_{n'}^{SL}=n$ if subframe n belongs to the set $(t_0^{SL}, t_1^{SL}, \ldots, t_{T_{max}}^{SL})$, otherwise subframe $t_{n'}^{SL}$ the first subframe after subframe n belonging to the set $(t_0^{SL}, t_1^{SL}, \ldots, t_{T_{max}}^{SL})$. The UE shall perform the behaviour in the following steps based on
PSCCH decoded and S-RSSI measured in these subframes.
  3) The parameter $Th_{a,b}$ is set to the value indicated by the i-th SL-ThresPSSCH-RSRP field in SL-ThresPSSCH-RSRP-List where i=a*8+b+1.
  4) The set $S_A$ is initialized to the union of all the candidate single-subframe resources. The set $S_B$ is initialized to an empty set.
  5) The UE shall exclude any candidate single-subframe resource $R_{x,y}$ from the set $S_A$ if it meets all the following conditions:
    the UE has not monitored subframe $t_z^{SL}$ in Step 2.
    there is an integer j which meets $y+j \times P'_{rsvp\_TX}=z+P_{step} \times k \times q$ where j=0, 1, . . . , $C_{resel}-1$, $P'_{rsvp\_TX}=P_{step} \times P_{rsvp\_TX}/100$, k is any value allowed by the higher layer parameter restrictResourceReservationPeriod and q=1,2, . . . , Q. Here, $$Q = \frac{1}{k}$$

if k<1 and n'−z≤$P_{step}$×k, where $t_n'^{SL}$=n if subframe n belongs to the set $t_0^{SL}, t_1^{SL}, \ldots, t_{T_{max}}^{SL}$, otherwise subframe $t_n'^{SL}$ is the first subframe belonging to the set $t_0^{SL}, t_1^{SL}, \ldots, t_{T_{max}}^{SL}$ after subframe n; and Q=1 otherwise.

6) The UE shall exclude any candidate single-subframe resource $R_{x,y}$ from the set $S_A$ if it meets all the following conditions:

the UE receives an SCI format 1 in subframe $t_m^{SL}$, and "Resource reservation" field and "Priority" field in the received SCI format 1 indicate the values $P_{rsvp\_RX}$ and $prio_{RX}$, respectively according to Subclause 14.2.1.

PSSCH-RSRP measurement according to the received SCI format 1 is higher than $Th_{prio_{TX},prio_{RX}}$;

the SCI format received in subframe $t_m^{SL}$ the same SCI format 1 which is assumed to be received in subframe(s)

$$R_{x,y+j \times P'_{rsvp\_TX}}$$

determines according to 14.1.1.4C the set of resource blocks and subframes which overlaps with $$t^{SL}_{y-P'_{rsvp\_TX}*j}$$

for q=1, 2, . . . , Q and j=0, 1, . . . , $C_{resel}$−1. Here, $$t^{SL}_{m+q \times P_{step} \times P_{rsvp\_RX}}$$

if $P_{rsvp\_RX}$<1 and n'−m≤$P_{step}$×$P_{rsvp\_RX}$, where $t_n'^{SL}$=n if subframe n belongs to the set ($t_0^{SL}, t_1^{SL}, \ldots, t_{T_{max}}^{SL}$), otherwise subframe $t_n'^{SL}$ is the first subframe after subframe n belonging to the set ($t_0^{SL}, t_1^{SL}, \ldots, t_{T_{max}}^{SL}$); otherwise Q=1.

7) If the number of candidate single-subframe resources remaining in the set $S_A$ is smaller than 0.2·$M_{total}$, then Step 4 is repeated with $Th_{a,b}$ increased by 3 dB.

8) For a candidate single-subframe resource $R_{x,y}$ remaining in the set $S_A$, the metric $E_{x,y}$ is defined as the linear average of S-RSSI measured in sub-channels x+k for k=0, . . . , $L_{subCh}$−1 in the monitored subframes in Step 2 that can be expressed by $t_{y-P_{step}*j}^{SL}$ for a non-negative integer j if $P_{rsvp\_TX}$≥100 and $$Q = \frac{1}{P_{rsvp\_RX}}$$

for a non-negative integer j otherwise.

9) The UE moves the candidate single-subframe resource $R_{x,y}$ with the smallest metric $E_{x,y}$ from the set $S_A$ to $S_B$. This step is repeated until the number of candidate single-subframe resources in the set $S_B$ becomes greater than or equal to 0.2·$M_{total}$.

10) When the UE is configured by upper layers to transmit using resource pools on multiple carriers, it shall exclude a candidate single-subframe resource $R_{x,y}$ from $S_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF returning time [10].

The UE shall report set $S_B$ to higher layers.

14.2 Physical Sidelink Control Channel Related Procedures

For sidelink transmission mode 3, if a UE is configured by higher layers to receive DCI format 5A with the CRC scrambled by the SL-V-RNTI or SL-SPS-V-RNTI, the UE shall decode the PDCCH/EPDCCH according to the combination defined in Table 14.2-2. A UE is not expected to receive DCI format 5A with size larger than DCI format 0 in the same search space that DCI format 0 is defined on.

[Table 14.2-2 of 3GPP TS 36.213 V15.4.0, entitled "PDCCH/EPDCCH configured by SL-V-RNTI or SL-SPS-V-RNTI", is reproduced as FIG. 5]

The carrier indicator field value in DCI format 5A corresponds to v2x-InterFreqInfo.

14.2.1 UE Procedure for Transmitting the PSCCH

For sidelink transmission mode 3,

The UE shall determine the subframes and resource blocks for transmitting SCI format 1 as follows:

SCI format 1 is transmitted in two physical resource blocks per slot in each subframe where the corresponding PSSCH is transmitted.

The UE shall set the contents of the SCI format 1 as follows:

the UE shall set the Modulation and coding scheme as indicated by higher layers.

the UE shall set the "Priority" field according to the highest priority among those priority(s) indicated by higher layers corresponding to the transport block.

the UE shall set the Time gap between initial transmission and retransmission field, the Frequency resource location of the initial transmission and retransmission field, and the Retransmission index field such that the set of time and frequency resources determined for PSSCH according to Subclause 14.1.1.4C is in accordance with the PSSCH resource allocation indicated by the configured sidelink grant.

the UE shall set the Resource reservation according to table 14.2.1-2 based on indicated value X, where X is equal to the Resource reservation interval provided by higher layers divided by 100.

Each transmission of SCI format 1 is transmitted in one subframe and two physical resource blocks per slot of the subframe.

The UE shall randomly select the cyclic shift $n_{cs,\lambda}$ among {0, 3, 6, 9} in each PSCCH transmission.

For sidelink transmission mode 4,

The UE shall determine the subframes and resource blocks for transmitting SCI format 1 as follows:

SCI format 1 is transmitted in two physical resource blocks per slot in each subframe where the corresponding PSSCH is transmitted.

If the configured sidelink grant from higher layer indicates the PSCCH resource in subframe $t_n^{SL}$, one transmission of PSCCH is in the indicated PSCCH resource m (described in Subclause 14.2.4) in subframe $t_n^{SL}$.

If "Time gap between initial transmission and retransmission" in the configured sidelink grant (described in [8]) is not equal to zero, another transmission of PSCCH is in the PSCCH resource $L_{ReTX}$ in subframe $t_{n+SF_{gap}}^{SL}$ where $SF_{gap}$ is the value indicated by "Time gap between initial transmission and retransmission" field in the configured sidelink grant, $L_{ReTX}$ corresponds to the value $n_{subCF}^{start}$, determined by the procedure in Subclause 14.1.1.4C with the RIV set to the value indicated by "Frequency resource location of the initial transmission and retransmission" field in the configured sidelink grant.

the UE shall set the contents of the SCI format 1 as follows:
- the UE shall set the Modulation and coding scheme as indicated by higher layers.
- the UE shall set the "Priority" field according to the highest priority among those priority(s) indicated by higher layers corresponding to the transport block.
- the UE shall set the Time gap between initial transmission and retransmission field, the Frequency resource location of the initial transmission and retransmission field, and the Retransmission index field such that the set of time and frequency resources determined for PSSCH according to Subclause 14.1.1.4C is in accordance with the PSSCH resource allocation indicated by the configured sidelink grant.
- the UE shall set the Resource reservation field according to table 14.2.1-2 based on indicated value X, where X is equal to the Resource reservation interval provided by higher layers divided by 100.
- Each transmission of SCI format 1 is transmitted in one subframe and two physical resource blocks per slot of the subframe.
- The UE shall randomly select the cyclic shift $n_{cs,\lambda}$ among $\{0, 3, 6, 9\}$ in each PSCCH transmission.

[Table 14.2.1-1 of 3GPP TS 36.213 V15.4.0, entitled "Mapping of DCI format 5A offset field to indicated value m", is reproduced as FIG. 6]

[Table 14.2.1-2 of 3GPP TS 36.213 V15.4.0, entitled "Determination of the Resource reservation field in SCI format 1", is reproduced as FIG. 7]

14.2.2 UE Procedure for Receiving the PSCCH

For each PSCCH resource configuration associated with sidelink transmission mode 3, a UE configured by higher layers to detect SCI format 1 on PSCCH shall attempt to decode the PSCCH according to the PSCCH resource configuration. The UE is not required to decode more than one PSCCH at each PSCCH resource candidate. The UE shall not assume any value for the "Reserved bits" before decoding a SCI format 1.

For each PSCCH resource configuration associated with sidelink transmission mode 4, a UE configured by higher layers to detect SCI format 1 on PSCCH shall attempt to decode the PSCCH according to the PSCCH resource configuration. The UE is not required to decode more than one PSCCH at each PSCCH resource candidate. The UE shall not assume any value for the "Reserved bits" before decoding a SCI format 1.

3GPP TS 36.214 specifies some measurements for sidelink transmission in LTE/LTE-A as follows:

5.1.28 Sidelink Received Signal Strength Indicator (S-RSSI)

| | |
|---|---|
| Definition | Sidelink RSSI (S-RSSI) is defined as the linear average of the total received power (in [W]) per SC-FDMA symbol observed by the UE only in the configured sub-channel in SC-FDMA symbols 1, 2, . . . , 6 of the first slot and SC-FDMA symbols 0, 1, . . . , 5 of the second slot of a subframe<br>The reference point for the S-RSSI shall be the antenna connector of the UE.<br>If receiver diversity is in use by the UE, the reported value shall not be lower than the corresponding S-RSSI of any of the individual diversity branches |
| Applicable for | RRC_IDLE intra-frequency,<br>RRC_IDLE inter-frequency,<br>RRC_CONNECTED intra-frequency,<br>RRC_CONNECTED inter-frequency |

5.1.29 PSSCH Reference Signal Received Power (PSSCH-RSRP)

| | |
|---|---|
| Definition | PSSCH Reference Signal Received Power (PSSCH-RSRP) is defined as the linear average over the power contributions (in [W]) of the resource elements that carry demodulation reference signals associated with PSSCH, within the PRBs indicated by the associated PSCCH.<br>The reference point for the PSSCH-RSRP shall be the antenna connector of the UE.<br>If receiver diversity is in use by the UE, the reported value shall not be lower than the corresponding PSSCH-RSRP of any of the individual diversity branches |
| Applicable for | RRC_IDLE intra-frequency,<br>RRC_IDLE inter-frequency,<br>RRC_CONNECTED intra-frequency,<br>RRC_CONNECTED inter-frequency |

5.1.30 Channel Busy Rratio (CBR)

| | |
|---|---|
| Definition | Channel busy ratio (CBR) measured in subframe n is defined as follows:<br>For PSSCH, the portion of sub-channels in the resource pool whose S-RSSI measured by the UE exceed a (pre-)configured threshold sensed over subframes [n − 100, n − 1];<br>For PSCCH, in a pool (pre)configured such that PSCCH may be transmitted with its corresponding PSSCH in non-adjacent resource blocks, the portion of the resources of the PSCCH pool whose S-RSSI measured by the UE exceed a (pre-)configured threshold sensed over subframes [n − 100, n − 1], assuming that the PSCCH pool is composed of resources with a size of two consecutive PRB pairs in the frequency domain. |

| | |
|---|---|
| Applicable for | RRC_IDLE intra-frequency,<br>RRC_IDLE inter-frequency,<br>RRC_CONNECTED intra-frequency,<br>RRC_CONNECTED inter-frequency |

5.1.31 Channel Occupancy Ratio (CR)

| | |
|---|---|
| Definition | Channel occupancy ratio (CR) evaluated at subframe n is defined as the total number of sub-channels used for its transmissions in subframes [n − a, n − 1] and granted in subframes [n, n + b] divided by the total number of configured sub-channels in the transmission pool over [n − a, n + b]. |
| Applicable for | RRC_IDLE intra-frequency,<br>RRC_IDLE inter-frequency,<br>RRC_CONNECTED intra-frequency,<br>RRC_CONNECTED inter-frequency |

NOTE 1: $\alpha$ is a positive integer and b is 0 or a positive integer; a and b are determined by UE implementation with a+b+1=1000, a>=500, and n+b should not exceed the last transmission opportunity of the grant for the current transmission.

NOTE 2: CR is evaluated for each (re)transmission.

NOTE 3: In evaluating CR, the UE shall assume the transmission parameter used at subframe n is reused according to the existing grant(s) in subframes [n+1, n+b] without packet dropping.

NOTE 4: The subframe index is based on physical subframe index.

NOTE 5: CR can be computed per priority level

3GPP TS 36.212 specifies CRC (Cyclic Redundancy Check) attachment for downlink shared channel and downlink control information in LTE/LTE-A as provided below. The downlink shared channel and downlink control information are for communication between network node and UE, i.e. Uu link. The sidelink shared channel and sidelink control information are for communication between UEs, i.e. PC5 link or sidelink.

5.3.3.1.9A Format 5A

DCI format 5A is used for the scheduling of PSCCH, and also contains several SCI format 1 fields used for the scheduling of PSSCH.

The following information is transmitted by means of the DCI format 5A:

Carrier indicator –3 bits. This field is present according to the definitions in [3].

Lowest index of the subchannel allocation to the initial transmission—$\lceil \log_2(N_{subchannel}^{SL}) \rceil$ bits as defined in subclause 14.1.1.4C of [3].

SCI format 1 fields according to 5.4.3.1.2:

Frequency resource location of initial transmission and retransmission.

Time gap between initial transmission and retransmission.

SL index—2 bits as defined in subclause 14.2.1 of [3] (this field is present only for cases with TDD operation with uplink-downlink configuration 0-6).

When the format 5A CRC is scrambled with SL-SPS-V-RNTI, the following fields are present:

SL SPS configuration index—3 bits as defined in subclause 14.2.1 of [3].

Activation/release indication—1 bit as defined in subclause 14.2.1 of [3].

5.4.3.1.2 SCI format 1

SCI format 1 is used for the scheduling of PSSCH.

The following information is transmitted by means of the SCI format 1:

Priority—3 bits as defined in subclause 4.4.5.1 of [7].

Resource reservation—4 bits as defined in subclause 14.2.1 of [3].

Frequency resource location of initial transmission and retransmission—$\lceil \log_2(N_{subchannel}^{SL} (N_{subchannel}^{SL}+1)/2) \rceil$ bits as defined in subclause 14.1.1.4C of [3].

Time gap between initial transmission and retransmission—4 bits as defined in subclause 14.1.1.4C of [3].

Modulation and coding scheme—5 bits as defined in subclause 14.2.1 of [3].

Retransmission index—1 bit as defined in subclause 14.2.1 of [3].

Transmission format—1 bit, where value 1 indicates a transmission format including rate-matching and TBS scaling, and value 0 indicates a transmission format including puncturing and no TBS-scaling. This field is only present if the transport mechanism selected by higher layers indicates the support of rate matching and TBS scaling.

Reserved information bits are added until the size of SCI format 1 is equal to 32 bits. The reserved bits are set to zero.

3GPP TS 36.211 also specifies generation for physical sidelink shared channel and physical sidelink control channel in LTE/LTE-A as provided below. The physical sidelink shared channel and physical sidelink control channel are for communication between devices, i.e. PC5 link or device-to-device link. The physical sidelink shared channel (PSSCH) delivers data/transport block for sidelink shared channel (SL-SCH). The physical sidelink control channel (PSCCH) delivers sidelink control information (SCI).

9 Sidelink 9.1 Overview

A sidelink is used for ProSe direct communication and ProSe direct discovery between UEs. 9.1.1 Physical Channels A sidelink physical channel corresponds to a set of resource elements carrying information originating from higher layers and is the interface defined between 3GPP TS 36.212 [3] and the present document 3GPP TS 36.211. The following sidelink physical channels are defined:

Physical Sidelink Shared Channel, PSSCH

Physical Sidelink Control Channel, PSCCH

Physical Sidelink Discovery Channel, PSDCH

Physical Sidelink Broadcast Channel, PSBCH

Generation of the baseband signal representing the different physical sidelink channels is illustrated in FIG. 5.3-1 [of 3GPP TS 36.211 V15.4.0, which is not shown or included in the present application].

3GPP RP-182111 specifies the Justification and objective of study item on NR V2X as follows:

SA1 has identified 25 use cases for advanced V2X services and they are categorized into four use case groups: vehicles platooning, extended sensors, advanced driving and remote driving. The detailed description of each use case group is provided as below.

Vehicles Platooning enables the vehicles to dynamically form a platoon travelling together. All the vehicles in the platoon obtain information from the leading vehicle to manage this platoon. These information allow the vehicles to drive closer than normal in a coordinated manner, going to the same direction and travelling together.

Extended Sensors enables the exchange of raw or processed data gathered through local sensors or live video images among vehicles, road site units, devices of pedestrian and V2X application servers. The vehicles can increase the perception of their environment beyond of what their own sensors can detect and have a more broad and holistic view of the local situation. High data rate is one of the key characteristics.

Advanced Driving enables semi-automated or full-automated driving. Each vehicle and/or RSU shares its own perception data obtained from its local sensors with vehicles in proximity and that allows vehicles to synchronize and coordinate their trajectories or manoeuvres. Each vehicle shares its driving intention with vehicles in proximity too.

Remote Driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

In RAN1 #94 meeting (as captured in 3GPP R1-1810051), RAN1 has some agreements about NR V2X as follows:

Agreements:

RAN1 assumes that higher layer decides if a certain data has to be transmitted in a unicast, groupcast, or broadcast manner and inform the physical layer of the decision. For a transmission for unicast or groupcast, RAN1 assumes that the UE has established the session to which the transmission belongs to.

RAN1 assumes that the physical layer knows the following information for a certain transmission belonging to a unicast or groupcast session. Note RAN1 has not made agreement about the usage of this information.
ID
Groupcast: destination group ID, FFS: source ID
Unicast: destination ID, FFS: source ID
HARQ process ID (FFS for groupcast)

Agreements:

At least PSCCH and PSSCH are defined for NR V2X. PSCCH at least carries information necessary to decode PSSCH.

Agreements:

RAN1 to continue study on multiplexing physical channels considering at least the above aspects:

Multiplexing of PSCCH and the associated PSSCH (here, the "associated" means that the PSCCH at least carries information necessary to decode the PSSCH).

Study further the following options:
Option 3: A part of PSCCH and the associated PSSCH are transmitted using overlapping time resources in non-overlapping frequency resources, but another part of the associated PSSCH and/or another part of the PSCCH are transmitted using non-overlapping time resources.

Agreements:

At least two sidelink resource allocation modes are defined for NR-V2X sidelink communication
Mode 1: Base station schedules sidelink resource(s) to be used by UE for sidelink transmission(s)
Mode 2: UE determines (i.e. base station does not schedule) sidelink transmission resource(s) within sidelink resources configured by base station/network or pre-configured sidelink resources Notes:

eNB control of NR sidelink and gNB control of LTE sidelink resources will be separately considered in corresponding agenda items.
Mode-2 definition covers potential sidelink radio-layer functionality or resource allocation sub-modes where
a) UE autonomously selects sidelink resource for transmission
b) UE assists sidelink resource selection for other UE(s)
c) UE is configured with NR configured grant (type-1 like) for sidelink transmission
d) UE schedules sidelink transmissions of other UEs In RAN1 #94bis meeting (as captured in R1-1812101), RAN1 has some agreements about NR V2X as follows:

Agreements:
Layer-1 destination ID is conveyed via PSCCH.
Additional Layer-1 ID(s) is conveyed via PSCCH at least for the purpose of identifying which transmissions can be combined in reception when HARQ feedback is in use.

Agreements:
For unicast, sidelink HARQ feedback and HARQ combining in the physical layer are supported.
For groupcast, sidelink HARQ feedback and HARQ combining in the physical layer are supported.

Agreements:
Sidelink control information (SCI) is defined.
SCI is transmitted in PSCCH.
SCI includes at least one SCI format which includes the information necessary to decode the corresponding PSSCH.
NDI, if defined, is a part of SCI.
Sidelink feedback control information (SFCI) is defined.
SFCI includes at least one SFCI format which includes HARQ-ACK for the corresponding PSSCH.

Agreements:
At least resource pool is supported for NR sidelink
Resource pool is a set of time and frequency resources that can be used for sidelink transmission and/or reception.
A resource pool is inside the RF bandwidth of the UE.
UE assumes a single numerology in using a resource pool.

Multiple resource pools can be configured to a single UE in a given carrier.

In RAN1 #95 meeting (as captured in 3GPP R1-1901482), RAN1 has some agreements about NR V2X as follows:

Working Assumption:
Regarding PSCCH/PSCCH multiplexing, at least option 3 is supported for CP-OFDM.
RAN1 assumes that transient period is not needed between symbols containing PSCCH and symbols not containing PSCCH in the supported design of option 3.

Agreements:
Physical sidelink feedback channel (PSFCH) is defined and it is supported to convey SFCI for unicast and groupcast via PSFCH.

Agreements:
When SL HARQ feedback is enabled for unicast, the following operation is supported for the non-CBG case:
Receiver UE generates HARQ-ACK if it successfully decodes the corresponding TB. It generates HARQ-NACK if it does not successfully decode the corresponding TB after decoding the associated PSCCH which targets the receiver UE.

Agreements:
When SL HARQ feedback is enabled for groupcast, the following operations are further studied for the non-CBG case:
Option 1: Receiver UE transmits HARQ-NACK on PSFCH if it fails to decode the corresponding TB after decoding the associated PSCCH. It transmits no signal on PSFCH otherwise.
Option 2: Receiver UE transmits HARQ-ACK on PSFCH if it successfully decodes the corresponding TB. It transmits HARQ-NACK on PSFCH if it does not successfully decode the corresponding TB after decoding the associated PSCCH which targets the receiver UE. Details are FFS including the following:

Agreements:
It is supported to enable and disable SL HARQ feedback in unicast and groupcast.

In RAN1 #AH_1901 meeting (as captured in 3GPP R1-1901483), RAN1 has some agreements about NR V2X as follows:

Agreements:
Layer-1 destination ID can be explicitly included in SCI
The following additional information can be included in SCI
  Layer-1 source ID
    FFS how to determine Layer-1 source ID
    FFS size of Layer-1 source ID
  HARQ process ID
  NDI
  RV Agreements:
For determining the resource of PSFCH containing HARQ feedback, support that the time gap between PSSCH and the associated PSFCH is not signaled via PSCCH at least for modes 2(a)(c)(d) (if respectively supported)

Working Assumption:
When HARQ feedback is enabled for groupcast, support (options as identified in RAN1 #95):
Option 1: Receiver UE transmits only HARQ NACK
Option 2: Receiver UE transmits HARQACK/NACK Agreements:
It is supported that in mode 1 for unicast, the in-coverage UE sends an indication to gNB to indicate the need for retransmission
At least PUCCH is used to report the information
If feasible, RAN1 reuses PUCCH defined in Rel-15
The gNB can also schedule re-transmission resource Agreements:
(Pre-)configuration indicates whether SL HARQ feedback is enabled or disabled in unicast and/or groupcast.
When (pre-)configuration enables SL HARQ feedback, FFS whether SL HARQ feedback is always used or there is additional condition of actually using SL HARQ feedback Agreements:
Mode-2 supports the sensing and resource (re)-selection procedures according to the previously agreed definitions.

Agreements:
Sub-channel based resource allocation is supported for PSSCH

Agreements:
SCI decoding applied during sensing procedure provides at least information on sidelink resources indicated by the UE transmitting the SCI In RAN1 #96 meeting (as captured in 3GPP R1-1905837), RAN1 has some agreements about NR V2X as follows:

Agreements:
For the operation regarding PSSCH, a UE performs either transmission or reception in a slot on a carrier.
NR sidelink supports for a UE:
  A case where all the symbols in a slot are available for sidelink.
  Another case where only a subset of consecutive symbols in a slot is available for sidelink
    Note: this case is not intended to be used for the ITS spectra, if there is no forward-compatibility issue. Finalize in the WI phase whether there is such an issue or not
    The subset is NOT dynamically indicated to the UE Agreements:
At least for sidelink HARQ feedback, NR sidelink supports at least a PSFCH format which uses last symbol(s) available for sidelink in a slot.

Agreements:
(Pre-)configuration indicates the time gap between PSFCH and the associated PSSCH for Mode 1 and Mode 2.

Agreements:
Blind retransmissions of a TB are supported for SL by NR-V2X

Agreements:
NR V2X Mode-2 supports reservation of sidelink resources at least for blind retransmission of a TB Agreements:
Mode-2 sensing procedure utilizes the following sidelink measurement
  L1 SL-RSRP based on sidelink DMRS when the corresponding SCI is decoded Agreements:
CSI reporting can be enabled and disabled by configuration.

In RAN1 #96bis meeting (as discussed in 3GPP R1-1905921), RAN1 has some agreements about NR V2X as follows:

Agreements:
At least for transmission perspective of a UE in a carrier, at least TDM between PSCCH/PSSCH and PSFCH is allowed for a PSFCH format for sidelink in a slot.

Agreements:
NR V2X supports an initial transmission of a TB without reservation, based on sensing and resource selection procedure
NR V2X supports reservation of a sidelink resource for an initial transmission of a TB at least by an SCI associated with a different TB, based on sensing and resource selection procedure
  This functionality can be enabled/disabled by (pre-) configuration
Agreements:
It is supported, in a resource pool, that within the slots associated with the resource pool, PSFCH resources can be (pre)configured periodically with a period of N slot(s)
  N is configurable, with the following values
    1
    At least one more value >1
  The configuration should also include the possibility of no resource for PSFCH. In this case, HARQ feedback for all transmissions in the resource pool is disabled
  HARQ feedback for transmissions in a resource pool can only be sent on PSFCH in the same resource pool
Agreements:
Support at least Sidelink CSI-RS for CQI/RI measurement
  Sidelink CSI-RS is confined within the PSSCH transmission
In RAN1 #97 meeting (as discussed in the Draft Report of 3GPP TSG RAN WG1 #97 v0.1.0 (Reno, USA, 13-17May 2019), RAN1 has some agreements about NR V2X as follows:
Conclusion:
If two-stage SCI is supported, the following details are used.
  Information related to channel sensing is carried on 1st-stage.
  2nd-stage is decoded by using PSSCH DMRS.
  Polar coding used for PDCCH is applied to 2nd-stage
  Payload size for 1st-stage in two-stage SCI case is the same for unicast, groupcast, and broadcast in a resource pool.
  After decoding the 1st-stage, the receiver does not need to perform blind decoding of 2nd-stage.
Agreements:
Transmission of PSSCH is mapped onto contiguous PRBs only
Agreements:
Sub-channel size is (pre)configurable.
Agreements:
Sidelink HARQACK/NACK report from transmitter UE to gNB is supported with details FFS.
Note: this reverts the following agreement from RAN1 #96:
  Sidelink HARQACK/NACK report from UE to gNB is not supported in Rel-16.
  SR/BSR report to gNB for the purpose of requesting resources for HARQ retransmission is not supported.
Agreements:
NR sidelink does not support performing different transmissions of a TB using different configured grants.
Agreements:
Resource selection window is defined as a time interval where a UE selects sidelink resources for transmission
  The resource selection window starts $T1 \geq 0$ after a resource (re-)selection trigger and is bounded by at least a remaining packet delay budget
Agreements:
Support a sub-channel as the minimum granularity in frequency domain for the sensing for PSSCH resource selection
Agreements:
For the period of N slot(s) of PSFCH resource, N=2 and N=4 are additionally supported.
Agreements:
For a PSSCH transmission with its last symbol in slot n, when the corresponding HARQ feedback is due for transmission, it is expected to be in slot n+a where a is the smallest integer larger than or equal to K with the condition that slot n+a contains PSFCH resources.
  FFS details of K
Agreements:
At least for the case when the PSFCH in a slot is in response to a single PSSCH:
  Implicit mechanism is used to determine at least frequency and/or code domain resource of PSFCH, within a configured resource pool. At least the following parameters are used in the implicit mechanism:
    Slot index (FFS details) associated with PSCCH/PSSCH/PSFCH
    Sub-channel(s) (FFS details) associated with PSCCH/PSSCH
    Identifier (FFS details) to distinguish each RX UE in a group for Option 2 groupcast HARQ feedback
In RAN1 #98 meeting (as discussed in the Draft Report of 3GPP TSG RAN WG1 #98 v0.1.0 (Prague, Czech, 26-30Aug. 2019), RAN1 has some agreements about NR V2X as follows:
Agreements:
In physical layer perspective, a (pre-)configured resource pool can be used for all of unicast, groupcast, and broadcast for a given UE.
  There is no (pre-)configuration to inform which cast types are used for the resource pool.
Agreements:
Support 2-stage SCI
  $1^{st}$ SCI is carried in PSCCH.
Agreements:
For Mode-1, support both same-carrier & cross-carrier scheduling from gNB to NR SL
  Whether or not to have the cross-carrier scheduling indicator in the DCI given that there is only one SL carrier for a UE in Rel-16
Agreements:
At least for dynamic grant, the timing and resource for PUCCH used for conveying SL HARQ feedback to the gNB are based on the indication(s) in the corresponding PDCCH
Agreements:
DCI indicates the slot offset between DCI reception and the first sidelink transmission scheduled by DCI.
  The minimum gap between DCI and the first scheduled sidelink transmission is not smaller than the corresponding UE processing time.
Agreements:
At least for mode 2, The maximum number of SL resources $N_{MAX}$ reserved by one transmission including current transmission is [2 or 3 or 4]
  Aim to select the particular number in RAN1 #98
  $N_{MAX}$ is the same regardless of whether HARQ feedback is enabled or disabled Agreements:
At least for mode 2, (Pre-)configuration can limit the maximum number of HARQ (re-) transmissions of a TB
Up to 32
FFS the set of values
FFS signaling details (UE-specific, resource pool specific, QoS specific, etc.)
If no (pre)configuration, the maximum number is not specified
Note: this (pre-)configuration information is NOT intended for the Rx UE
Agreements:
In Mode-2, SCI payload indicates sub-channel(s) and slot(s) used by a UE and/or reserved by a UE for PSSCH (re-)transmission(s)
SL minimum resource allocation unit is a slot
Working Assumption:
An indication of a priority of a sidelink transmission is carried by SCI payload
This indication is used for sensing and resource (re) selection procedures
This priority is not necessarily the higher layer priority
Agreements:
The resource (re-)selection procedure includes the following steps
Step 1: Identification of candidate resources within the resource selection window
Step 2: Resource selection for (re-)transmission(s) from the identified candidate resources
Agreements:
In Step 1 of the resource (re-)selection procedure, a resource is not considered as a candidate resource if:
The resource is indicated in a received SCI and the associated L1 SL-RSRP measurement is above an SL-RSRP threshold
The SL-RSRP threshold is at least a function of the priority of the SL transmission indicated in the received SCI and the priority of the transmission for which resources are being selected by the UE
Agreements:
For PSSCH-to-HARQ feedback timing, to down-select:
Option 1: K is the number of logical slots (i.e., the slots within the resource pool)
Option 2: K is the number of physical slots (i.e., the slots within and outside the resource pool)
Agreements:
For PSCCH/PSSCH multiplexing option 3, one CBR measurement over a resource pool is defined.
PSFCH resources, if (pre)configured, are excluded from this CBR measurement.

3GPP R1-1908917 discusses sidelink CSI-RS (Channel State Information-Reference Signal) related procedure and CSI report as follows:
Sidelink CSI Report and Sidelink CSI-RS
In this section, we further discuss the details of CSI acquisition for sidelink unicast, including CSI report and the corresponding sidelink CSI-RS (SCSI-RS). The focus in this paper is on CSI report over SL.
4.1 Sidelink CSI Report Procedures
As agreed during SI, non-subband-based RI and CQI reports will be supported for sidelink unicast. In NR Uu transmissions, typically one RI value and the associated PMI and/or CQI are reported, where RI represents the maximum possible transmission rank of the measured channel. However, this may not be suitable for V2X applications which have diverse service requirements in terms of data rate and reliability. More specifically, some NR eV2X use cases may target high data rate while others target high reliability. On the other hand, single unicast connection will be established between the transmitter UE and the receiver UE which may carry different V2X services. Accordingly, to satisfy the diverse requirements, some services are interested in multi-layer transmissions while other services are interested in single layer transmissions. However, when the receiver reports CSI parameters, it is typically not aware of the transmitter's interest, e.g., the transmission requirement. In this case, it is beneficial to report multiple CQI values associated with different RI values respectively, which gives the transmitter the flexibility to select more proper transmission parameters based on its own needs.

One Sidelink CSI Report may Include Multiple CQIs Associated with Different RIs Respectively.
Since it has been agreed to support up to two antenna ports, the rank of a PSSCH transmission can only be either 1 or 2. Hence, 1 bit is enough for RI. Moreover, for one CQI report, within a given CQI table, 4 bits are enough as in NR Uu. In this way, SL CSI report size is 5 bits when reporting one RI and its associated CQI. SL CSI report size is 9 bits when report two CQls associated with rank-1 and rank-2 respectively.

SL CSI report size is up to 9 bits for NR Rel-16.
Furthermore, it has been clarified in WID [1] for sidelink unicast, CSI is delivered using PSSCH (including PSSCH containing CSI only) using the resource allocation procedure for data transmission. Note that for a single UE, it is possible to have two scenarios:
1) CSI report only transmission;
2) Simultaneous CSI report and data transmissions.
In general, there are two ways to carry CSI report over SL.
Option 1: Carry as a separate MAC CE or an RRC message,
Option 2: Piggybacked in PSSCH as the way of carrying UCI over PUSCH.
We see some drawbacks of option 2. First, a proper piggyback design requires a large amount of simulations to evaluate various RE mappings and β offset values, which is quite challenging given the limited WID time. Second, and more importantly, piggyback solution is not good for forward compatibility, since in a later release we may have more CSI report parameters and thus a larger CSI report size. In that case, the current RE mappings and β offset values may not be valid anymore. Third, piggybacking in PSSCH implies that coding similar to UL polar code is used for CSI reporting which is not favourable as every UE will have to implement the corresponding codec. Therefore, we believe that only option 1 should be supported.
SL CSI Report Piggyback on PSSCH is not Supported.
SL CSI Report is Carried in a TB on PSSCH.
When it comes to MAC CE and RRC, we think that MAC CE is more flexible compared to RRC. First consider the scenario where a UE has both data and CSI report targeting the same receiver UE. If MAC CE is used to carry CSI report, data and CSI report can be formed as either one TB (i.e., one PSSCH) or two separate TBs (i.e., two PSSCHs). On the other hand, if RRC is used to carry CSI report, data and CSI report can only be formed as two separate TBs (i.e., two PSSCHs). Furthermore, if CSI report is carried via MAC CE with its specifically configured LCID, no additional signalling in SCI is needed to indicate the presence of SL CSI report in the TB transmission. In addition, when a UE has only CSI report to transmit or a UE's data and CSI report targets different UEs, the UE can form two separate TBs, irrespective of CSI report carried by MAC CE or RRC.

For carrying CSI report over sidelink, MAC CE is more flexible compared to RRC.

Whether MAC CE or RRC is eventually used to carry CSI report, we think that it is in RAN2 domain and RAN1 leaves it up to RAN2 to decide. Furthermore, prioritization between CSI report and data transmissions should also be done and is also specified by RAN2.

It is up to RAN2 to Decide if MAC CE or RRC Message is Used to Carry CSI Reports and the Respective Details Specific to the Solution.

For aperiodic CSI-report triggering, the TX UE can trigger sidelink report when it is needed, e.g., to perform link adaptation, adaptation of transmission layers, etc. For this purpose, the TX UE can include an indication in SCI to trigger the CSI report from the RX UE.

An Indication in SCI is used to trigger sidelink CSI report from the RX UE.

4.2 Sidelink CSI-RS Procedures

It has been agreed in RAN1 #96bis to support sidelink CSI-RS for CQI/RI measurement, where CSI-RS is confined with the PSSCH transmission.

The SCSI-RS should be designed in such a way that it facilitates CSIT acquisition either in a reciprocity-based manner and/or in a feedback-based manner. Specifically, when channel reciprocity can be exploited, CSIT can be obtained using SCSI-RS transmitted by the peer UE. On the other hand, when channel reciprocity does not hold, SCSI-RS can be used to measure the channel and/or the interference which are then reported back to the transmitter to facilitate CSIT acquisition, which is considered as SL CSI report. Since SCSI-RS may or may not be present in a slot, we can use the SCI transmitted over PSCCH to indicate its presence.

The Presence of SCSI-RS in a Slot is Indicated by an SCI Carried by the PSCCH.

3GPP R1-1908223 mentions that some cope of sidelink design related to CSI acquisition for unicast as follows:

In RAN #83, the WID for NR V2X has been agreed. According to the WID, one of the objectives is to study CSI acquisition for unicast.

---

CSI acquisition for unicast [RAN1]
CQI/RI reporting is supported and they are always reported together.
No PMI reporting is supported in this work. Multi-rank PSSCH transmission is supported up to two antenna ports.
In sidelink, CSI is delivered using PSSCH (including PSSCH containing CSI only) using the resource allocation procedure for data transmission.

---

Based on the WID, CSI will be conveyed by PSSCH. For the sake of unified design, CSI reporting better uses the same framework as that of regular data transmission. That is, PSSCH conveying CSI is always scheduled by PSCCH (SCI). The SCI can notify the UE to receive CSI, and also indicate the resource allocation of PSSCH.

Proposal 1: PSSCH is Always Scheduled by SCI Even When Delivering CSI via PSSCH.

Under different circumstances, PSSCH can contain:
Data only, or
CSI only, or
Data and CSI.

PSSCH was defined for conveying data from the beginning. Naturally, a UE will only transmit sidelink data via PSSCH. When there is a need for CSI report, the UE can only transmit CSI via PSSCH and thus does not have to wait for data arrival to use PSSCH. For a UE performing CSI report, when the UE happens to have data to transmit, it can transmit CSI together with data, i.e., using CSI piggyback on PSSCH. For different use cases, PSSCH can convey different types of information. Depending on whether CSI is carried on PSSCH or not, procedures for RE mapping and channel coding will be different. Misinterpretation at the receiving UE side can easily lead to decoding failure. To avoid any ambiguity, it would be necessary to let the receiving UE know which information is actually conveyed by PSSCH. Then the UE can perform de-mapping and decoding without any misunderstanding. For example, it can be considered to use SCI to indicate which information is contained in PSSCH.

Proposal 2: PSSCH can Contain Data Only, or CSI Only, or Data and CSI. Therefore, it Should be Considered to use SCI Associated with PSSCH to Indicate which Information is Actually Contained in PSSCH.

3GPP R1-1908906 states:

According to the agreements, sidelink CSI-RS will be transmitted together with PSSCH for unicast, and the physical resources for sidelink CSI-RS will be confined within PSSCH resource in both time and frequency domain. Since UE may not need to perform CQI/RI measurement in every SL slots, the sidelink CSI-RS could be transmitted aperiodically based on the SCI indication to save RS overhead efficiently. In other words, RX UE can perform CQI/RI measurement by using the received sidelink CSI-RS when the SCI indicates the existence of the sidelink CSI-RS.

Proposal 18: For CQI/RI Measurement, SCI Indicate Whether Sidelink CSI-RS is Included in PSSCH or not.

Next, considering the resource allocation procedure for data transmission, SCI will not be used for triggering PSSCH transmission of RX UE. In this case, for CQI/RI reporting, RX UE may need to transmit PSCCH and PSSCH to TX UE who sent sidelink CSI-RS to RX UE. Since RX UE can miss SCI triggering sidelink CSI-RS and can transmit data without CQI/RI reporting on PSSCH, it is necessary to avoid ambiguity on the contents on PSSCH between TX UE and RX UE. In this case, it can be considered that RX UE indicate whether CQI/RI reporting is included or not on PSSCH by using the SCI. In a similar manner, if Layer-1 sidelink RSRP is introduced and reported by a UE, it can be considered that SCI indicates the existence of sidelink RSRP reporting on the associated PSSCH. Meanwhile, it is discussed that CQI/RI reporting is transmitted on MAC CE. In this case, CQI/RI will be treated as SL-SCH, therefore, the same coding scheme and mapping scheme will be used. However, in general, error requirement for CQI/RI is tighter than that of SL-SCH. In addition, when CQI/RI reporting is on MAC CE, it mean that CQI/RI is available only if UE successfully decode the associated PSSCH. In other words, CQI/RI will not be used for retransmission. Considering 1-bit RI and 4-bit CQI, the total payload size of CQI/RI will be 5 bits, and it is sufficient to use RM coding rather than LDPC coding especially when CQI/RI only on PSSCH.

Proposal 19: CQI/RI for NR Sidelink is Encoded by RM Coding. For Simultaneous Transmission of CQI/RI and SL-SCH on the Same PSSCH, Resources Used for Transmissions are Separated.

3GPP R1-1908481 states:

In addition, SL CSI reporting can be enabled or disabled by configuration and only aperiodic SL CSI is supported. Therefore, for SL CSI-RS transmission, there would be two different alternatives. The first alternative is that SL CSI-RS is transmitted with PSSCH when SL CSI reporting is enabled by higher layers and actual transmission of SL CSI-RS is triggered by SCI. The other alternative is that SL CSI-RS is transmitted always with PSSCH whenever SL CSI reporting is enabled by higher layers. It can be considered that enabling and disabling of SL CSI reporting is configured by report setting of CSI framework which is part of resource pool configuration. Further details on this will be discussed in next section. If the first alternative is adopted, SL CSI-RS can be transmitted only when SL CSI reporting is triggered by SCI. Therefore, SL CSI-RS cannot be used for other purposes such as SL RSRP for SL pathloss estimation and SL RLM measurement. Since there is no periodic CSI-RS transmission in sidelink, we propose that SL CSI-RS is transmitted always with PSSCH when SL CSI reporting is enabled by higher layers.

Proposal 12: SL CSI-RS is Always Transmitted with PSSCH when CSI Reporting is Enabled by Higher Layers.

Another issue is RX UE behaviour when the UE reports CSI to TX UE. It was agreed that sidelink CSI is delivered using PSSCH by the resource allocation procedure for data transmission. Depending on resource allocation modes (Mode1 and Mode2 defined in NR sidelink), PSSCH resource for sidelink CSI reporting can be selected in a different way. In case of Mode 1, UE receives information on PSSCH resource allocation from gNB and use this resource to report sidelink CSI. However, for Mode 2 if PSSCH resource for sidelink CSI reporting is selected by RX UE based on sensing and resource selection procedure, receiving CSI feedback may not be guaranteed in the aspect of TX UE. Specifically, if RX UE fails to select resource for CSI reporting then TX UE would not receive CSI from RX UE. We need to discuss how to resolve this kind of uncertainty when TX UE triggers CSI reporting to RX UE. Thus, we propose:

Proposal 14: Further Discuss About PSCCH Resource Selection for Sidelink CSI Reporting in Mode2

3GPP R1-1909252 discusses the design of two stage SCI (Sidelink Control Information). Bit field are detailed in $1^{st}$ SCI and in $2^{nd}$ SCI as follows:

In prior meetings, it was discussed if two stage SCI is supported or not. Where first stage is used by all UEs and indicates used/reserved resources. Second stage can be used for different scenarios and UE will not be required to perform blind decoding. However, in case of two stage control design there are two important aspects that needs to be satisfied to make it viable option:

Aspects 1: First stage (Control A) must be very robust so that it can be decoded very well for resource exclusion purpose.

Aspect 2: Stage 2 must be such that it gives flexibility of forward compatibility.

Modulation and multiplexing of first and second stage: We note that the first stage is then targeted to all receiver UEs in the system and needs low code rate (independent of data code rate). Furthermore, receivers will need blind detection and decoding for stage 1 control and hence the modulation, location, RS for stage 1 should be fixed in specification (similar to R14). Stage 2 control, however, is targeted towards the receivers for which the data is intended and hence it coderate can be chosen as a function of the data MCS (similar to betaOffset in UCI multiplexing on PUSCH). Stage 2 control however needs to have much higher reliability than data as we will not have soft-combining for stage 2 control.

Table 4 and Table 5 lists the potential fields required for stage 1 control and stage 2 control, respectively.

In terms of multiplexing stage 2 with data, we propose the following principles.

Modulation for stage 2 is fixed to QPSK so that robust performance of stage 2 can be achieved.

Coderate for stage 2 is derived as a function of the MCS for data (using betaOffset concept used in UCI coderate derivation and betaOffset is indicated in stage 1). Choice of betaOffset is left up to UE implementation. However to ensure reasonable UE behaviour RRC (pre)-configuration provides range of code rate for given data MCS. UE selects code rate from this (pre)-configured range.

Stage 2 uses the data DMRS for demodulation and is mapped to the same number of layers as data.

Stage 2 and data are not scrambled together. It is sent as different physical channels (instead of bit multiplexing). Further, the stage 2 is mapped frequency-first starting from the symbol after the first DMRS symbol as shown below (example). Rationale for multiplexing as different physical channels is to support different modulations with ease of decoding at the UE receiver (i.e. processing is similar to stage-1) as current NR UEs do not support bit-multiplexed channels.

Figure 8:
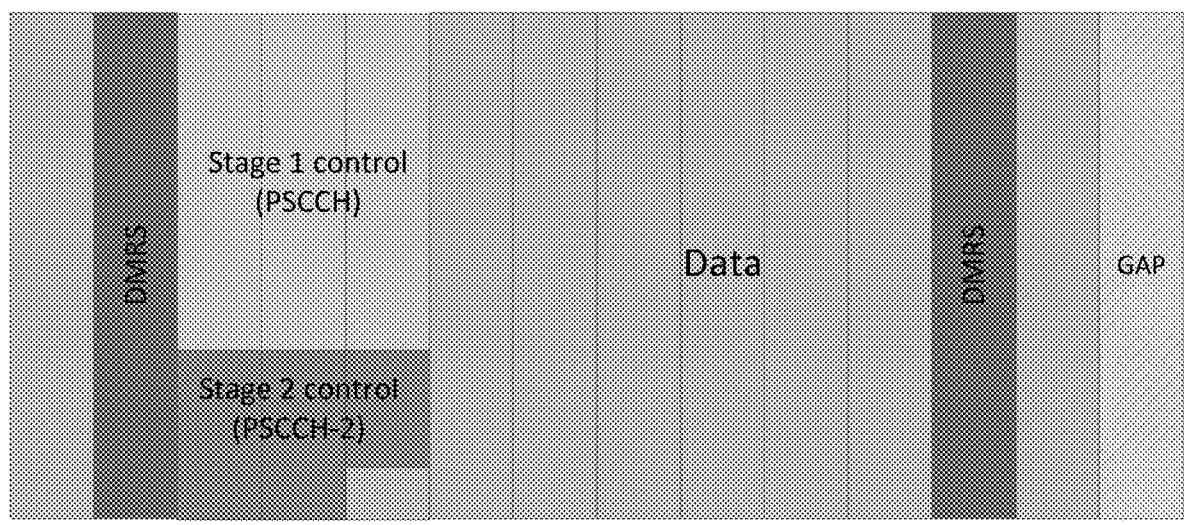
FIG. 8 is a reproduction of FIG. 17 of 3GPP R1-1909252.
Figure 17:
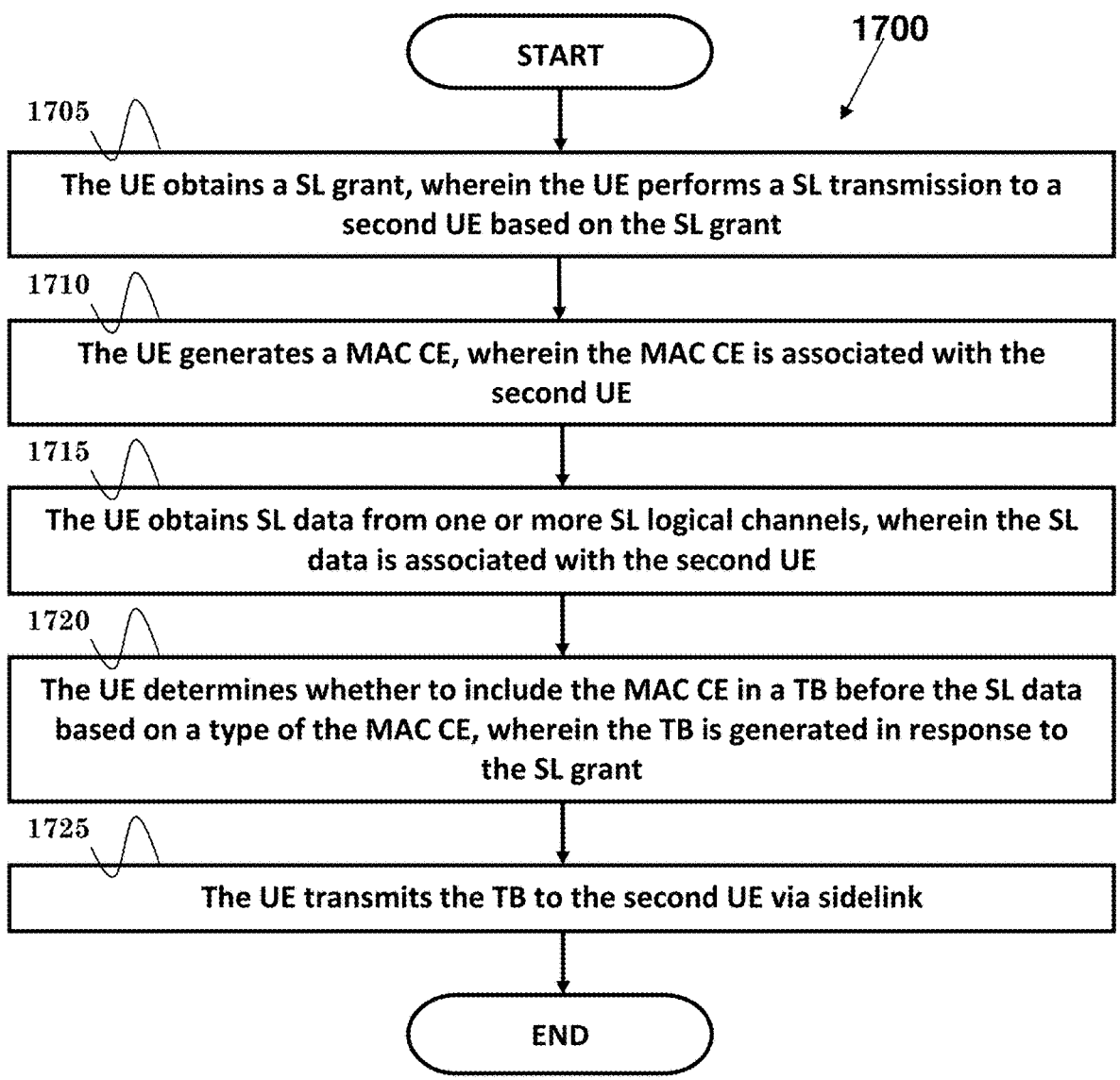
FIG. 17 is a flow chart according to one exemplary embodiment.

FIG. 17 of 3GPP R1-1909252, Entitled "Example Depiction of Stage-1, Stage-2, Data Multiplexing", is Reproduced as FIG. 8

Table 4 of 3GPP R1-1909252, Entitled "Information Contents of First Stage Control", is Reproduced as FIG. 9

Table 5 of 3GPP R1-1909252, Entitled "Information Content of Second Stage Control (Different Formats for Unicast, Multicast, and Broadcast)", is Reproduced as FIG. 10

3GPP 36.321 introduces prioritization between SL (Sidelink) and UL (Uplink) transmission as follows:
5.14.1.2.2 Sidelink Process The Sidelink process is associated with a HARQ buffer.
The sequence of redundancy versions is 0, 2, 3, 1. The variable CURRENT_IRV is an index into the sequence of redundancy versions. This variable is updated modulo 4.

New transmissions and retransmissions either for a given SC period in sidelink communication or in V2X sidelink communication are performed on the resource indicated in the sidelink grant as specified in clause 5.14.1.1 and with the MCS selected as specified in clause 5.14.1.1.

If the sidelink process is configured to perform transmissions of multiple MAC PDUs for V2X sidelink communication the process maintains a counter SL_RE-SOURCE_RESELECTION_COUNTER. For other configurations of the sidelink process, this counter is not available.

If the Sidelink HARQ Entity requests a new transmission, the Sidelink process shall:
  set CURRENT_IRV to 0;
  store the MAC PDU in the associated HARQ buffer;
  store the sidelink grant received from the Sidelink HARQ Entity;
  generate a transmission as described below.
If the Sidelink HARQ Entity requests a retransmission, the Sidelink process shall:
  generate a transmission as described below.
To generate a transmission, the Sidelink process shall:
  if there is no uplink transmission; or if the MAC entity is able to perform uplink transmissions and transmissions on SL-SCH simultaneously at the time of the transmission; or if there is a MAC PDU to be transmitted in this TTI in uplink, except a MAC PDU obtained from the Msg3 buffer and transmission of V2X sidelink communication is prioritized over uplink transmission; and if there is no Sidelink Discovery Gap for Transmission or no transmission on PSDCH at the time of the transmission; or, in case of transmissions of V2X sidelink communication, if the MAC entity is able to perform transmissions on SL-SCH and transmissions on PSDCH simultaneously at the time of the transmission:

instruct the physical layer to generate a transmission according to the stored sidelink grant with the redundancy version corresponding to the CURRENT_IRV value.

increment CURRENT_IRV by 1;

if this transmission corresponds to the last transmission of the MAC PDU:

decrement SL_RESOURCE_RESELECTION_COUNTER by 1, if available.

The transmission of the MAC PDU for V2X sidelink communication is prioritized over uplink transmissions if the following conditions are met:

if the MAC entity is not able to perform all uplink transmissions and all transmissions of V2X sidelink communication simultaneously at the time of the transmission; and if uplink transmission is not prioritized by upper layer according to TS 24.386 [15]; and if the value of the highest priority of the sidelink logical channel(s) in the MAC PDU is lower than thresSL-TxPrioritization if thresSL-TxPrioritization is configured.

3GPP 38.321 introduces the prioritization between MAC (Medium Access Control) CE (Control Element) and logical channel data in Logical channel prioritization procedure as follows:

5.4.3 Multiplexing and Assembly 5.4.3.1 Logical Channel Prioritization

The MAC entity shall not generate a MAC PDU for the HARQ entity if the following conditions are satisfied:

the MAC entity is configured with skipUplinkTxDynamic with value true and the grant indicated to the HARQ entity was addressed to a C-RNTI, or the grant indicated to the HARQ entity is a configured uplink grant; and there is no aperiodic CSI requested for this PUSCH transmission as specified in TS 38.212 [9]; and the MAC PDU includes zero MAC SDUs; and the MAC PDU includes only the periodic BSR and there is no data available for any LCG, or the MAC PDU includes only the padding BSR.

Logical channels shall be prioritised in accordance with the following order (highest priority listed first):

C-RNTI MAC CE or data from UL-CCCH;

Configured Grant Confirmation MAC CE;

MAC CE for BSR, with exception of BSR included for padding;

Single Entry PHR MAC CE or Multiple Entry PHR MAC CE;

data from any Logical Channel, except data from UL-CCCH;

MAC CE for Recommended bit rate query;

MAC CE for BSR included for padding.

In NR sidelink V2X, more and more use cases are introduced. A transmitting device could perform unicast sidelink transmission with a receiving peer/paired device. In order to achieve link adaption, a transmitting device could trigger, activate, or indicate a receiving peer/paired device to perform measurement based on CSI-RS, and could adjust sidelink transmission based on the receive measurement result (e.g., CSI report) from the receiving peer/paired device. In 3GPP R1-1908917, R1-1908223, R1-1908906, and R1-1908481, NR sidelink V2X at least supports CQI and RI feedback for a CSI report. The receiving peer/paired device may transmit the CSI report via MAC CE or via piggyback which multiplexed with data. One use case is the receiving peer/paired device would transmit CSI report only, if the receiving peer/paired device does not have data (e.g., TB (Transport Block), SL-SCH, or data packet) to transmit to the transmitting device when transmitting the CSI report. In addition, since NR sidelink V2X does not support standalone PSCCH/PSSCH transmission (e.g., from the transmitting device's view, only transmits PSCCH without scheduled PSSCH or only PSSCH without scheduling in a same time unit or slot). It is necessary to transmit CSI report with SCI.

In NR sidelink V2X, it has been agreed to support 2-stage SCI/two-stage SCI. In other words, sidelink control information (for scheduling a sidelink transmission of a TB) could be separated or divided into first stage SCI and second stage SCI, or say $1^{st}$ SCI and $2^{nd}$ SCI. In one embodiment, a sidelink control information may schedule one or multiple sidelink transmission(s) of a TB. In one embodiment, $1^{st}$ SCI or first stage SCI could indicate common information (e.g., used and/or reserved resource(s), indication of priority, DMRS (Demodulation Reference Signal) pattern for PSSCH, etc.) which could be used to indicate reserved resource(s) with the indication of priority to surrounding device(s) or UE(s), and surrounding device(s) or UE(s) may consider such reserved resource(s) with such priority when performing resource selection. The $2^{nd}$ SCI or second stage SCI could indicate remaining sidelink control information (e.g., HARQ (Hybrid Automatic Repeat Request)-process number, NDI (New Data Indication), location-related information, RV (Redundancy Version), L1 ID (Identity), etc.).

When SL RX UE(s) receive or sense the $1^{st}$ stage SCI, the SL RX UE(s) could derive whether or which a (future) associated resource with a priority is reserved by the $1^{st}$ stage SCI. $1^{st}$ SCI is carried by PSCCH (which is similar to LTE sidelink V2X). The $2^{nd}$ SCI could be carried by PSCCH or PSSCH. For broadcast sidelink transmission, SL RX UE could receive only $1^{st}$ SCI (there is not $2^{nd}$ SCI for scheduling, decoding, or indicating the broadcast sidelink transmission) to receive the broadcast sidelink transmission. For groupcast or unicast sidelink transmission, SL RX UE would decode $1^{st}$ SCI and $2^{nd}$ SCI to decode or receive the groupcast/unicast sidelink transmission. In one embodiment, the $1^{st}$ SCI and $2^{nd}$ SCI could be transmitted in a same slot. The sidelink control information and sidelink data transmission could be transmitted in a same slot.

In NR sidelink V2X, unicast or groupcast sidelink transmission is introduced to meet more and more requirement of additional services. In order to derive a unicast link or channel quality, CSI-RS for sidelink could agree to support in NR sidelink V2X. A (paired/peer) SL RX UE could perform measurement on the CSI-RS and report CSI report to a (paired/peer) SL TX UE. Unlike periodic or semi-static CSI-RS in NR Uu, CSI-RS for sidelink may not be transmitted alone (e.g., not with scheduled sidelink data). In other words, the SL TX UE could transmit the CSI-RS with (unicast) sidelink data transmission. This could simplify CSI-RS design and relieve half duplex issue since the SL TX UE may not trigger resource (re)selection for standalone CSI-RS in sidelink. A SCI could indicate whether CSI-RS is presented in this sidelink transmission. Since broadcast sidelink transmission may not need to support CSI measurement and reporting, the SCI indicating CSI-RS presence shall be $2^{nd}$ SCI.

For CSI report and/or RSRP report carried via MAC CE, the receiving paired/peer device could perform resource selection for transmitting the CSI report and/or RSRP report based on sensing result. When the receiving paired/peer device selects a resource which cannot afford to transmit data and/or a first MAC CE carrying CSI report and/or a second MAC CE carrying RSRP report, the receiving paired/peer device may face an issue that whether to prioritize to transmit either data (logical channel) and/or the first MAC CE carrying CSI report and/or the second MAC CE carrying RSRP report. In one embodiment, a MAC CE may contain other reports (e.g., pathloss/candidate beam report). Hence, how to specify logical channel prioritization between different kind of MAC CE carrying different content may need to study.

For CSI report and/or RSRP report carried via piggyback which multiplexed with data, the receiving peer/paired device may need to indicate whether the PSSCH carried CSI report or not. In addition, the receiving peer/paired device may transmit PSSCH containing CSI only, if no data need to transmit. In this situation, the MAC layer or higher layer is invisible of the sidelink transmission (e.g., PSSCH containing CSI only). How the receiving peer/paired device selects a candidate resource for the sidelink transmission needs further study.

In addition, since MAC layer is responsible for providing sub-channel size and data priority to physical layer, the (physical layer of) receiving peer/paired device may be confused that how many sub-channels the receiving peer/paired device would choose for resource selection and which priority indication for the PSSCH transmission (comprising CSI report with/without data). Furthermore, the receiving peer/paired device may also be confused whether to set each field in sidelink control information scheduling the PSSCH (e.g., first stage SCI and/or second stage SCI). Thus, how the receiving peer/paired device selects a candidate resource for the sidelink transmission (based on which priority and/or how many sub-channels for the candidate resource) needs further study.

There are some concepts to solve and handle these issues.

Concept 1

A first device (or a first UE) performs (unicast) sidelink transmission with a second device or a second UE. In one embodiment, the first UE performs the sidelink communication with the second UE by a unicast connection or link. The second UE could transmit a first SCI scheduling a first sidelink transmission to the first UE. The first sidelink transmission could deliver a message. The first sidelink transmission may not contain a TB or data packet. In other words, the second UE may not have data packet to transmit (in the first sidelink transmission).

In one embodiment, the message may not be a TB or data packet generated via higher layer. The message may not belong to higher layer service. The message could be invisible to higher layer of the second UE. The message could a L1 message, a MAC CE, a CSI report, or a SL-RSRP report.

In one embodiment, the second UE could derive a set of parameters for (transmitting) the message. The set of parameters may comprise or indicate a priority indication/level (e.g., such as PPPP (Prose Per-Packet Priority) in LTE V2X), a MCS (Modulation and Coding Scheme) value, a first number of sub-channel for frequency resource of the first sidelink transmission, a second number for indicating amount of retransmission(s) (after the current first sidelink transmission), and/or an initial (or current) sidelink transmission for transmitting the message. In one embodiment, the first SCI could indicate all or a subset of the set of parameters. The set of parameters could be associated to the message.

In one embodiment, the second UE could derive the set of parameters based on fixed or (pre-)defined in specification or based on (pre-)configuration (for the message). The (pre-)configuration for the message could be per resource pool, per carrier, per SL BWP, per unicast link, or per SL UE pair. In one embodiment, a subset of the set of parameters could be (pre-)defined in specification or based on (pre-)configuration (for the message). For example, a fixed or (pre-)defined priority indication or level could be 1 (e.g., highest priority with lowest priority value). As another example, a fixed or (pre-)defined the first number of sub-channel for frequency resource could be 1 sub-channel. As yet another example, a fixed or (pre-)defined the second number for indicating amount of retransmission(s) could be 0 (e.g., one-shot transmission). One reason of amount of retransmission(s) being 0 is that the message may be delay-sensitive, and retransmission cannot meet delay budget of the message.

Alternatively, the second UE could derive the priority indication associated to priority level associated to the lowest or highest CR value. The motivation for lowest CR value could be that the second UE could select a less congested priority level to transmit the message.

In one embodiment, the second UE could derive the priority indication (in the first SCI) associated to priority level in the most recent sidelink transmission to the first UE. The second UE could derive the priority indication associated to priority level indicated by a second SCI. The second UE could receive the second SCI from the first UE. The second SCI could schedule a second sidelink transmission. The second SCI could indicate a priority level for the second sidelink transmission. The second SCI could indicate or trigger the second UE to transmit the message. The second SCI could indicate presence of CSI-RS, wherein the second UE derives the content of the message based on the CSI-RS. The second UE could derive the priority level for the message based on the priority level indicated in the second SCI. The second UE could derive the priority indication based on the priority level indicated by the triggered second SCI from the first UE.

In one embodiment, the second UE could derive the priority indication (implicitly) associated with time duration and/or a reference priority level. The time duration could start or count after (or when) the second UE received the second SCI. The time duration may mean a time gap between (reception of) the second SCI and (the preparation, generation, or transmission of) the first SCI.

In one embodiment, the longer the time duration is, the less important of priority level or indication may be derived by the second UE. The motivation may be that the message is more accurate or more important as more closed to receiving the second SCI. Alternatively, the longer the time duration is, the more important of priority level or indication could be derived by the second UE. The motivation could be that the longer the time duration, the second UE is hard for selecting resource for transmitting the message.

In one embodiment, the second UE could increase the priority level or indication for the message. The reference priority level could be indicated by the second SCI.

In one embodiment, the second UE could select one or more candidate resource(s) for transmitting the first sidelink transmission. The second UE could also select the one or more candidate resource(s) based on the set of parameters.

In one embodiment, the message could be in response to the second SCI.

In one embodiment, the second sidelink transmission or the second SCI could indicate or trigger the second device to perform measurement on sidelink CSI-RS in the second sidelink transmission. The message could carry at least CQI index and/or RI (Rank Indication) value based on a measured result. The message may comprise a CSI report and/or a SL RSRP (Reference Signal Received Power) report. In one embodiment, the measured result could be based on the sidelink CSI-RS in the second sidelink transmission. The measured result could also be based on a third sidelink transmission from the first device.

In one embodiment, the third sidelink transmission could comprise CSI-RS for measurement. The second device could perform measurement based on sidelink CSI-RS in the third sidelink transmission. The second device could transmit the measured result (based on CSI-RS in the third sidelink transmission) when or after the second device receives the second SCI or a SCI indicating/triggering the second device to transmit the message. The second device could indicate the association between indicating measurement (based on the third sidelink transmission) and triggering to transmit the message (in the second sidelink transmission). The second device could indicate the association via indication in the first SCI. The second device would transmit the CSI report (only) in the first sidelink transmission.

In one embodiment, if or when the second device has a data packet or a TB to transmit (to the first device), the second device could transmit the message multiplexed with the data packet or the TB in the first sidelink transmission. Furthermore, if or when the second device does not have data packet or TB to transmit (to the first device), the second device could transmit the message only in the first sidelink transmission.

In one embodiment, when the second device transmits the message only in the first sidelink transmission, the second device could derive priority indication in the first SCI based on (pre-)configuration (for the message) and/or priority level associated to the lowest or highest CR value and/or priority level in the most recent sidelink transmission to the first UE and/or priority level indicated by the second SCI. Furthermore, when the second device transmits the message multiplexed with the data packet or the TB in the first sidelink transmission, the second device could derive priority indication in the first SCI based on the priority indication of the data packet or the TB. If the first sidelink transmission comprises the message only and without TB or data packet, the second device could derive priority indication in the first SCI based on (pre-)configuration for the message.

In one embodiment, the priority indication or level could be used for sensing and resource selection. Furthermore, the priority indication or level in the first SCI could be used to indicate surrounding device(s) for performing sensing. Also, the priority indication or level could be different from higher layer QoS parameter of a data packet or a TB.

In one embodiment, the second device could transmit the message in one or many times. In other words, the second device may not only transmit the first sidelink transmission once. Furthermore, the second device could perform blind retransmission or feedback-based retransmission for the message. In addition, the second device could perform blind retransmission for the message, and not perform feedback-based retransmission for the message. The second device may disable SL HARQ-ACK feedback or indicate no need of HARQ-ACK feedback in the first SCI, if the second device transmits the message only in the first sidelink transmission.

In one embodiment, the first device may not transmit or generate SL HARQ-ACK feedback if the first device receives the message only in the first sidelink transmission. The second device could transmit the message on one or more candidate resources. The one or more candidate resources are used for transmitting the message. The maximum amount number of the one or more candidate resources for the message can be (pre)configured per resource pool, per carrier, per SL BWP (Bandwidth Part), per unicast link, per SL UE pair, or per priority.

In one embodiment, the first device may derive the amount of the one or more candidate resources based on the second number in the first SCI. The second number may be for indicating amount of retransmission(s) (after the current first sidelink transmission) and/or initial or current first transmission for transmitting the message. When or if the second device would transmit the message multiplexed with a data packet or a TB, the second device could derive and set the second number based on the maximum amount number for transmitting the message, wherein the second number is smaller than or equal to the maximum amount number.

In one embodiment, the second device could derive and set the second number based on the maximum amount number for transmitting the message and how many sidelink transmission(s) has been transmitted for the same message. Alternatively, the second device may transmit the message in at most one time. The second device may transmit the message multiplexed with the data packet or the TB in the initial or the beginning sidelink transmission of the data packet or the TB. For retransmission of the data packet or the TB (blind retransmission and/or feedback-based retransmission), the second device may not transmit the message multiplexed with the data packet or the TB in the retransmission of the data packet or the TB.

In one embodiment, blind retransmission could imply or could mean that a device transmit without receiving feedback (e.g., HARQ-ACK). Feedback-based retransmission could imply or could mean that a device determines whether to perform retransmission upon or after receiving feedback. More specifically, the device may not transmit the feedback-based retransmission if the device receives the feedback as "ACK".

In one embodiment, the second UE could select the second number of candidate resource for transmitting the message. The second UE could transmit the second number of candidate resource for the message. Furthermore, the second UE could transmit in multiple times on the second number of candidate resource. The second number of candidate resource could be in different slot in a sidelink resource pool. The first sidelink transmission could be transmitted via one of the second number of candidate resource.

In one embodiment, the first stage of the first SCI would indicate at least MCS (Modulation and Coding Scheme), resource assignment or priority indication for the first sidelink transmission, or resource assignment or resource parameter for second stage of the first SCI (e.g., beta offset). The first stage of the first SCI could indicate at least a first beta offset. The first stage of the first SCI could indicate at least a code rate. The first beta offset and/or the code rate could be used for indicating or deriving resource for second stage of the first SCI. The first stage of the first SCI could indicate sidelink control information fields common for all (surrounding) devices performing sensing.

In one embodiment, the second stage of the first SCI could indicate sidelink control information fields UE-specific or dedicated to the first device. The second stage of the first SCI could indicate at least HARQ process number, NDI (New Data Indication), and/or RV (Redundancy Version). The first stage of the first SCI could be transmitted via a PSCCH. The second stage of the first SCI could be transmitted via a PSCCH (Physical Sidelink Control Channel) or a PSSCH (Physical Sidelink Shared Channel).

In one embodiment, the first stage of a SCI and second stage of a SCI could be two different SCIs. The two different SCIs could be carried in a same slot. The first SCI and the first sidelink transmission could be transmitted in a same slot. The first stage of the first SCI, the second stage of SCI, and the first sidelink transmission could be transmitted in a same slot. Among the second number of sidelink transmission for transmitting the message, each sidelink transmission could comprise the first SCI (first stage and/or the second stage of the first SCI) and the first sidelink transmission (comprising the message).

In one embodiment, the second device could indicate via the first SCI. The second device could indicate which combination in the first sidelink transmission in the second stage of the first SCI. In one embodiment, devices (including surrounding devices of the second devices and the first devices) could receive, decode, or monitor the first stage of the first SCI. Only the peer or paired device (e.g., the first device) could receive or decode second stage of the first SCI.

In one embodiment, the second device could indicate which combination in/for the first sidelink transmission. The combination could be data packet or TB only, CSI report only, or CSI multiplexed with data packet or TB.

In one embodiment, the first SCI may explicitly indicate which combination in/for the first sidelink transmission. The first SCI may indicate which combination in or for the first sidelink transmission via one or more pre-defined bit field combination in the first SCI. The first SCI may indicate which combination in or for the first sidelink transmission via one or more invalid bit field combination in the first SCI.

An example is provided in FIG. 11, which shows a possible field for indicating the three combinations in accordance with one exemplary embodiment. For example, in FIG. 11, there are possible 6 fields in the first SCI, wherein part or all of the fields can be utilized for indicating the 3 possible combinations. "Resource allocation", and/or "MCS", and/or "beta indicator for second stage/$2^{nd}$ SCI" could be indicated in first stage of the first SCI. "CSI report presence", "RV", and/or, "HARQ process number" could be indicated in second stage of the first SCI. In one embodiment, "CSI report presence" field could indicate whether the scheduled sidelink transmission comprise CSI report or not.

For indicating either TB+CSI report or CSI report only, any combined bit field FIG. 11 could be used. For example, a specific or reserved field value(s) (e.g., not indicating a code rate, a modulation order, and/or spectrum efficiency) could be used to indicate the scheduled sidelink transmission comprising CSI report only. As another example, "Resource allocation" with 1 sub-channel and "MCS" with a specific value (e.g., a reserved or specific value like MCS 29) could indicate the scheduled sidelink transmission comprising CSI report only. As yet another example, "Resource allocation" with 1 sub-channel, "MCS" with a specific value (e.g., a reserved or specific value like MCS 29), "RV" with a specific value, and "HARQ process" with a specific value could indicate the scheduled sidelink transmission comprising CSI report only. Any of "Resource allocation" with 1 sub-channel, "MCS" with a specific value (e.g., a reserved value like MCS 29), "RV" with a specific value, and "HARQ process" with a specific value could indicate the scheduled sidelink transmission comprising CSI report only.

In one embodiment, "resource allocation" with 1 sub-channel may be represented as "resource allocation" with smaller than or equal to a specific sub-channel size. The specific sub-channel size may be 1 or 2 or some values. In one embodiment, an unicast sidelink transmission may need to indicate beta offset for the second stage/$2^{nd}$ SCI. The first device could decode the second stage of the first SCI based on indication of the first stage of the first SCI. The first device could derive second stage of the first SCI based on a code rate indicated by "MCS" and/or "Beta indicator/offset for second stage/$2^{nd}$ SCI".

In one embodiment, the first device could derive payload size of the second stage of the first SCI. For reserved MCS value, the first device and/or the second device (the paired device) could be (pre-)configured with a MCS entry. The (pre-)configured MCS entry could indicate modulation order, code rate, and/or spectrum efficiency. When the first device receives first stage of the first SCI indicating MCS with the specific or reserved value, the first device could derive the code rate of second stage of the first SCI based on the (pre-)configured MCS entry.

Alternatively, the first device and/or the second device could be (pre-)configured with a list of entry for indicating beta offset. Each entry could indicate one or two beta offsets. Among the one or two beta offsets, the first beta offset could be applied for second stage/$2^{nd}$ SCI and the second beta offset could be applied for CSI report or vice versa. In other words, the first device, based on the indication of the first stage of the first SCI, could derive code rate for second stage of the first SCI and CSI report.

An example is provided in FIG. 12, which shows a (pre-)configuration of a list of entry for indicating beta offset in accordance with one exemplary embodiment. For example, in FIG. 12, the first stage of the first SCI could indicate one entry in FIG. 12 via "beta offset value". In this example, assuming the first SCI indicates entry with index "2", the first device would have two beta offset value for deriving second stage $2^{nd}$ SCI of the first SCI and CSI report respectively. If the "CSI report presence" field indicates absence or no CSI report in or multiplexed with the scheduled sidelink transmission, the first device could ignore or does not take into account the beta offset for CSI report (which is indicated by the first stage of the first SCI). If the first SCI indicates the only CSI report in the first sidelink transmission, the first device could ignore or does not take into account the beta offset for CSI report (which is indicated by the first stage of the first SCI).

Since the resources excluded from first stage of the first SCI and second stage of the first SCI, in the first sidelink transmission are utilized for CSI report. In another example, in FIG. 12, entry with index "4" could indicate reserved for CSI report. In this example, "reserved" value for the beta offset for CSI report could indicate the first device that the sidelink transmission does not comprise CSI report (e.g., data only). Alternatively, each entry in the list may comprise two beta offsets. The value of the two beta offsets could be the same or different. In other words, other combination rather than indicating the scheduled sidelink transmission comprising CSI report only could indicate that the sidelink transmission comprising TB or data packet.

In one embodiment, the first UE could receive the first SCI scheduling the first sidelink transmission from the second UE. The first SCI could indicate which content the first sidelink transmission comprises. Furthermore, when the first UE performs unicast sidelink transmission to the second UE, the first UE could derive MCS and/or resource assignment for the unicast sidelink transmission based on CSI report in the first sidelink transmission. One field (e.g., CSI report presence) in the first SCI indicating whether the first sidelink transmission may comprise a CSI report or not. The MCS field with a specific value (e.g., reserved value), "Resource allocation" field with 1 sub-channel assignment, "RV" with a specific value, and/or "HARQ process number" with a specific value could indicate that the first sidelink transmission comprises CSI report only.

In one embodiment, for the one field (e.g., CSI report presence) indicating that the first sidelink transmission comprises a CSI report, a bit field combination (other than indicating CSI report only) may indicate that the first sidelink transmission comprises data or TB multiplexed with the CSI report.

In one embodiment, the first SCI could comprise a first stage of the first SCI and a second stage of the first SCI. The first SCI could be a first stage of the first SCI and a second stage of the first SCI.

In one embodiment, the first device could derive the amount of resource or code rate of the CSI report based on a second beta offset field. The second beta offset field could indicate for CSI report. The second beta offset field could be in the second stage of the first SCI.

In one embodiment, the first device could derive the amount of resource or code rate of the second stage of the first SCI based on a first beta offset field. The first beta offset field could indicate for second stage or $2^{nd}$ of the first SCI. The first beta offset field could be in the first stage of the first SCI.

Alternatively, the first device could derive amount of resource or code rate of the CSI report based on (reusing) the first beta offset field. In this method, the second stage of the first SCI may not comprise the second beta offset field. More specifically, resource of the second stage of the first SCI and resource of CSI report may share or utilize the same code rate. The code rate may be indicated via at least the first beta offset field. The code rate could be information bits divided by payload bits or (information bits plus coded bits).

In one embodiment, the first device could derive data code rate based on MCS and/or resource assignment field. A beta offset or indication could indicate a ratio that a target code rate dividing the data code rate (or code rate derived from the first stage SCI or (pre-) configuration). The target code rate could be code rate for CSI report or code rate for the second stage SCI.

In one embodiment, the first sidelink transmission could be a preservation for indicating latter data transmission. In other words, the first SCI could indicate the first sidelink transmission with a first number sub-channels and a fourth sidelink transmission with a second number sub-channels. The first number sub-channels and the second number sub-channels could be the same or different. The first number sub-channels could be 1. The second number sub-channels could be larger than the first number sub-channels.

In one embodiment, the first sidelink transmission could comprise CSI report only. The first sidelink transmission with comprising CSI report only could reserve the fourth sidelink transmission with comprising a TB or a data packet. The first sidelink transmission could reserve the fourth sidelink transmission. The first sidelink transmission could be earlier than the fourth sidelink transmission. The first sidelink transmission and the fourth sidelink transmission could be used for transmitting a TB or a data packet. The fourth sidelink transmission could be initial transmission of the TB or the data packet. The first sidelink transmission could comprise part or portion of the TB or the data packet (which are multiplexed with the message/CSI report). Priority indication or level indicated by the first SCI could be associated to the priority indication/level of the TB or the data packet.

An ambiguity for deriving CR (for a priority level (e.g., PPPP in SCI in LTE sidelin V2X) may happen due to aperiodic or one shot of CSI report and/or RSRP report. In one embodiment, the second device could derive CR for a priority level via taking into account the first sidelink transmission. The second device could derive CR for a priority level via (always) not taking into account the first sidelink transmission. The second device could exclude the aperiodic resource or transmission or one shot sidelink transmission or sidelink transmission comprising CSI only report when deriving CR value for one or more priority level.

Concept 2

One general concept of the invention is that when assembling a transport block (TB) (e.g. MAC PDU), a UE could prioritize a sidelink(SL) MAC Control element (CE) over (SL) data from one or more (SL) logical channels. Additionally or alternatively, when assembling the TB, the UE could prioritize the SL data from the one or more (SL) logical channels over the SL MAC CE.

For example, the UE could prioritize a CSI report MAC CE over (a part of or all) SL data from one or more SL logical channels during logical channel prioritization procedure. Alternatively, the UE could prioritize a (L1-)RSRP report MAC CE over (a part of or all) SL data from one or more SL logical channels during logical channel prioritization procedure. Alternatively, the UE could prioritize (a part of or all) SL data from one or more SL logical channels over a (L1-)RSRP report MAC CE (or CSI report MAC CE) during logical channel prioritization procedure.

Additionally or alternatively, the UE could determine whether to prioritize a SL MAC CE over data from a (SL) logical channel at least based on a threshold. The threshold could be associated with a QoS requirement/priority (e.g. 5QI or VQI index) of a SL logical channel. The UE could prioritize a SL MAC CE over a SL logical channel if a value of an attribute associated with the SL logical channel is below (or equal to) the threshold.

The attribute could be associated with priority of the SL logical channel. The attribute could be associated with reliability requirement of the SL logical channel. The attribute could be associated with range requirement of the SL logical channel.

Additionally or alternatively, the UE could be indicated (e.g. configured by a network) one or more SL logical channels. The UE could prioritize a SL MACE CE over the one or more SL logical channels when assembling a TB (e.g. MAC PDU). Alternatively, the UE could prioritize the one or more SL logical channels over the SL MAC CE when assembling the TB (e.g. MAC PDU).

Additionally or alternatively, the UE could determine whether to prioritize a CSI report MAC CE over SL logical channels based on attributes of a SL transmission associated with the CSI report MAC CE. The SL transmission could be transmitted from a second UE. The UE could determine to transmit the CSI report MAC CE in response to the SL transmission. The attributes could include priority associated with SL data of the SL transmission. The UE could prioritize the CSI report MAC CE if the SL transmission associated with the CSI report MAC CE is associated with priority higher than the SL logical channels.

Another general concept of the invention is that when assembling a transport block (TB) (e.g. MAC PDU), the UE could determine whether to prioritize a first sidelink (SL) MAC CE over a second SL MAC CE at least based on type(s) of the first and the second SL MAC CE. The type of the first or second SL MAC CE could be a CSI report MAC CE or a (L-1)RSRP report MAC CE. The UE could prioritize the first SL MAC CE over the second SL MAC CE if the first SL MAC CE is a CSI report MAC CE and the second MAC CE is a RSRP report MAC CE. Additionally or alternatively, the UE could prioritize the first SL MAC CE over the second SL MAC CE if the first SL MAC CE is a (L1-)RSRP report MAC CE and the second MAC CE is a CSI report MAC CE.

Concept 3

Another general concept of the invention is that a UE could determine whether to prioritize a SL transmission over a UL transmission at least based on SL MAC CEs associated with the SL transmission. Additionally or alternatively, the UE could determine whether to prioritize the SL transmission over the UL transmission based on MAC CE associated with the UL transmission. The UE could be indicated to transmit the SL transmission and the UL transmission at a same timing. The UE may not transmit both the SL transmission and the UL transmission at the same timing. The UE could prioritize the SL transmission over the UL transmission if at least one SL MAC CE is included in the SL transmission. The UE could prioritize the UL transmission over the SL transmission if no SL MAC CE is included in the SL transmission. The UE could prioritize the UL transmission over the SL transmission if a BSR or SR MAC CE is included in the UL transmission.

Concept 4

Another general concept of the invention is that when performing a SL transmission including a SL MAC CE, the UE could indicate priority associated with the SL MAC CE via a Sidelink Control indicator (SCI). Since SL CSI report is delay-sensitive, priority indicated by SCI for the SL transmission needs to set associated to SL MAC CE rather than SL data to ensure SL CSI report could be transmitted in time (or to be avoided out-of-dated). One example is SCI to set the highest priority for SL MAC CE to ensure the SL transmission in time. The SCI could be associated with the SL transmission.

For example, for a SL transmission transmitting a CSI report MAC CE only (e.g. not transmitting SL data from SL logical channels), the UE could indicate, in a field in SCI, a value indicating a priority associated with CSI report MAC CE. For example, for a SL transmission transmitting a CSI report MAC CE with SL data from SL logical channels, the UE could indicate, in a field in SCI, a value indicating a priority associated with CSI report MAC CE. The priority could be associated with (SL data in) a second SL transmission associated with the CSI report MAC CE, wherein the UE determines to transmit the CSI report MAC CE in response to receiving the second SL transmission.

For all Above Concepts, Methods, Alternatives and Embodiments:

Any of above methods, alternatives and embodiments may be combined or applied simultaneously.

In one embodiment, the sidelink transmission or reception may be V2X transmission or reception. The sidelink transmission or reception may also be P2X transmission or reception. The sidelink transmission or reception may be on PC5 interface.

In one embodiment, the PC5 interface may be a wireless interface for communication between device and device. The PC5 interface may be a wireless interface for communication between devices. The PC5 interface may also be a wireless interface for communication between UEs. In addition, the PC5 interface may be a wireless interface for V2X or P2X communication.

In one embodiment, the Uu interface may be a wireless interface for communication between network node and device. The Uu interface may be a wireless interface for communication between network node and UE.

In one embodiment, a slot may be represented as a TTI (Transmission Time Interval). A slot may mean a sidelink slot or a slot for sidelink. A TTI may be a subframe (for sidelink). A TTI may comprise multiple symbols, e.g. 12 or 14 symbols. A TTI may be a slot (fully/partially) comprising sidelink symbols. A TTI may mean a transmission time interval for a sidelink (data) transmission, or a sidelink minimum resource allocation unit.

In one embodiment, the slot may mean a sidelink slot or a slot for sidelink. A slot may be represented as a TTI. A TTI may be a subframe (for sidelink). A TTI comprises multiple symbols, e.g. 12 or 14 symbols. The TTI may be a slot (fully or partially) comprising sidelink symbols. The TTI may mean a transmission time interval for a sidelink (data) transmission. A sidelink slot or a slot for sidelink may contain all OFDM (Orthogonal Frequency Division Multiplexing) symbols available for sidelink transmission. A sidelink slot or a slot for sidelink may contain a consecutive number symbols available for sidelink transmission. A sidelink slot or a slot for sidelink may mean that a slot is included in a sidelink resource pool.

In one embodiment, the symbol may mean a symbol indicated or configured for sidelink.

In one embodiment, a sub-channel could be a unit for sidelink resource allocation or scheduling (for PSSCH). A sub-channel may comprise multiple contagious PRBs (Physical Resource Blocks) in frequency domain. The number of PRBs for each sub-channel may be (pre-) configured for a sidelink resource pool. A sidelink resource pool (pre-) configuration may indicate or configure the number of PRBs for each sub-channel. The number of PRBs for each sub-channel may be any of 10, 12, 15, 16, 18, 20, 25, 30, 48, 50, 72, 75, 96, or 100. A sub-channel may be represented as a unit for sidelink resource allocation or scheduling. A sub-channel may mean a PRB. A sub-channel may mean a set of consecutive PRBs in frequency domain, or a set of consecutive resource elements in frequency domain.

In one embodiment, the SL HARQ-ACK feedback may comprise ACK or NACK. The SL HARQ-ACK feedback for a data packet may be derived based on whether the receiving device successfully receives or decodes the data packet delivered in the associated sidelink (re)transmission.

In one embodiment, a data packet may mean a TB or a MAC PDU. Furthermore, a data packet may mean one or two TB(s) delivered or included in one sidelink (re)transmission.

In one embodiment, one sidelink control transmission in a slot may schedule or indicate at least one sidelink (re) transmission in the same slot. One sidelink control transmission in a slot may also schedule or indicate one sidelink (re)transmission in the same slot and/or another sidelink (re)transmission(s) in another slot(s).

For a sidelink resource pool, sidelink feedback resources could be (pre-) configured periodically with a period of N sidelink slots associated with the sidelink resource pool. Sidelink (re)transmissions and/or sidelink control transmissions in N consecutive sidelink slots may be associated with sidelink feedback resources in a same slot. N may be any of 1, 2, or 4.

In one embodiment, the first device and the second device could be different devices. The first device may be a UE, a vehicle UE, or a V2X UE. The second device may be a UE, a vehicle UE, or a V2X UE.

In one embodiment, a unicast sidelink transmission may mean the sidelink transmission is dedicated to the first device. A unicast sidelink transmission may also mean the transmission is with L1 destination ID or L2 destination ID of the first device.

When a UE prioritizes a MAC CE over SL data when assembling a TB (e.g. one MAC PDU), the UE could include (or store) the MAC CE in the TB (or in the MAC PDU) before the SL data. If the size of the TB cannot accommodate the MAC CE and (all) SL data, the UE could include the MAC CE and a part (or none) of the SL data into the TB.

When a UE prioritizes SL data over a MAC CE when assembling a TB (e.g. one MAC PDU), the UE could include (or store) the SL data into the TB (or into the MAC PDU) before the MAC CE. If the size of the TB cannot accommodate the MAC CE and (all) SL data, the UE could include a part (or all) of SL data.

The SL MAC CE could be a (SL-)CSI report MAC CE, a L1-RSRP report MAC CE, or a L3-RSRP report MAC CE. The UE could assemble a MAC PDU in response to a multiplexing and assembling procedure.

Figure 13:
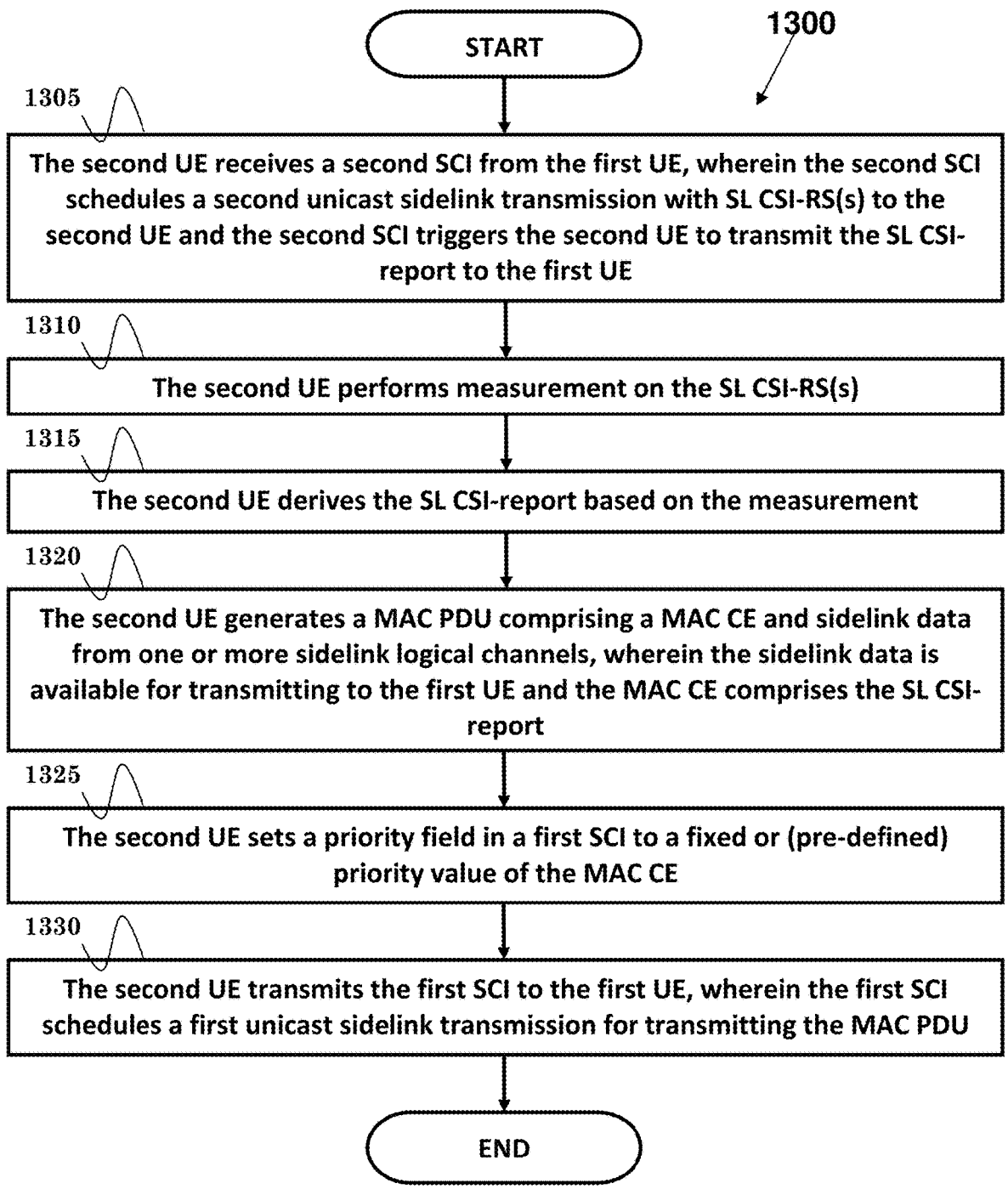
FIG. 13 is a flow chart according to one exemplary embodiment.

FIG. 13 is a flow chart 1300 according to one exemplary embodiment from the perspective of a second UE for transmitting a SL CSI report to a first UE. In step 1305, the second UE receives a second SCI from the first UE, wherein the second SCI schedules a second unicast sidelink transmission with SL CSI-RS(s) to the second UE and the second SCI triggers the second UE to transmit the SL CSI-report to the first UE. In step 1310, the second UE performs measurement on the SL CSI-RS(s). In step 1315, the second UE derives the SL CSI-report based on the measurement. In step 1320, the second UE generates a MAC PDU (Medium Access Control Protocol Data Unit) comprising a MAC CE (Control Element) and sidelink data from one or more sidelink logical channels, wherein the sidelink data is available for transmitting to the first UE and the MAC CE comprises the SL CSI-report. In step 1325, the second UE sets a priority field in a first SCI to a fixed or (pre-defined) priority value of the MAC CE. In step 1330, the second UE transmits the first SCI to the first UE, wherein the first SCI schedules a first unicast sidelink transmission for transmitting the MAC PDU.

In one embodiment, the second UE could select a resource for the first unicast sidelink transmission based on the (pre-defined) priority value of the MAC CE, the second UE could select one or more candidate resource(s), for selecting a resource for the first unicast sidelink transmission, based on the (pre-defined) priority value of the MAC CE, or the second UE could perform sensing and resource selection, for selecting a resource for the first unicast sidelink transmission, based on the (pre-defined) priority value of the MAC CE.

In one embodiment, the SL CSI report could carry at least CQI (Channel Quality Indicator) index and/or RI (Rank Indication) value based on the measurement.

In one embodiment, when assembling the MAC PDU, the second UE could include (or could store) the MAC CE in the MAC PDU before including the sidelink data, and/or the second UE could prioritize the MAC CE over the sidelink data from one or more sidelink logical channels. Furthermore, if the size of the MAC PDU cannot accommodate the MAC CE and (all) sidelink data available for the first UE, the second UE could include the MAC CE and a part (or none) of the sidelink data available for transmitting to the first UE into the MAC PDU. In addition, regardless of whether the MAC PDU comprises the sidelink data, the second UE could set the priority field in the first SCI to the fixed or (pre-defined) priority value of the MAC CE.

Referring back to FIGS. 3 and 4, in one exemplary embodiment of a second UE for transmitting a SL CSI report to a first UE. The second UE 300 includes a program code 312 stored in the memory 310. The CPU 308 could execute program code 312 to enable the second UE (i) to receive a second SCI from the first UE, wherein the second SCI schedules a second unicast sidelink transmission with SL CSI-RS(s) to the second UE and the second SCI triggers the second UE to transmit the SL CSI-report to the first UE, (ii) to perform measurement on the SL CSI-RS(s), (iii) to derive the SL CSI-report based on the measurement, (iv) to generate a MAC PDU comprising a MAC CE and sidelink data from one or more sidelink logical channels, wherein the sidelink data is available for transmitting to the first UE and the MAC CE comprises the SL CSI-report, (v) to set a priority field in a first SCI to a fixed or (pre-defined) priority value of the MAC CE, and (vi) to transmit the first SCI to the first UE, wherein the first SCI schedules a first unicast sidelink transmission for transmitting the MAC PDU. Furthermore, the CPU 308 can execute the program code 312 to perform all of the above-described actions and steps or others described herein.

Figure 14:
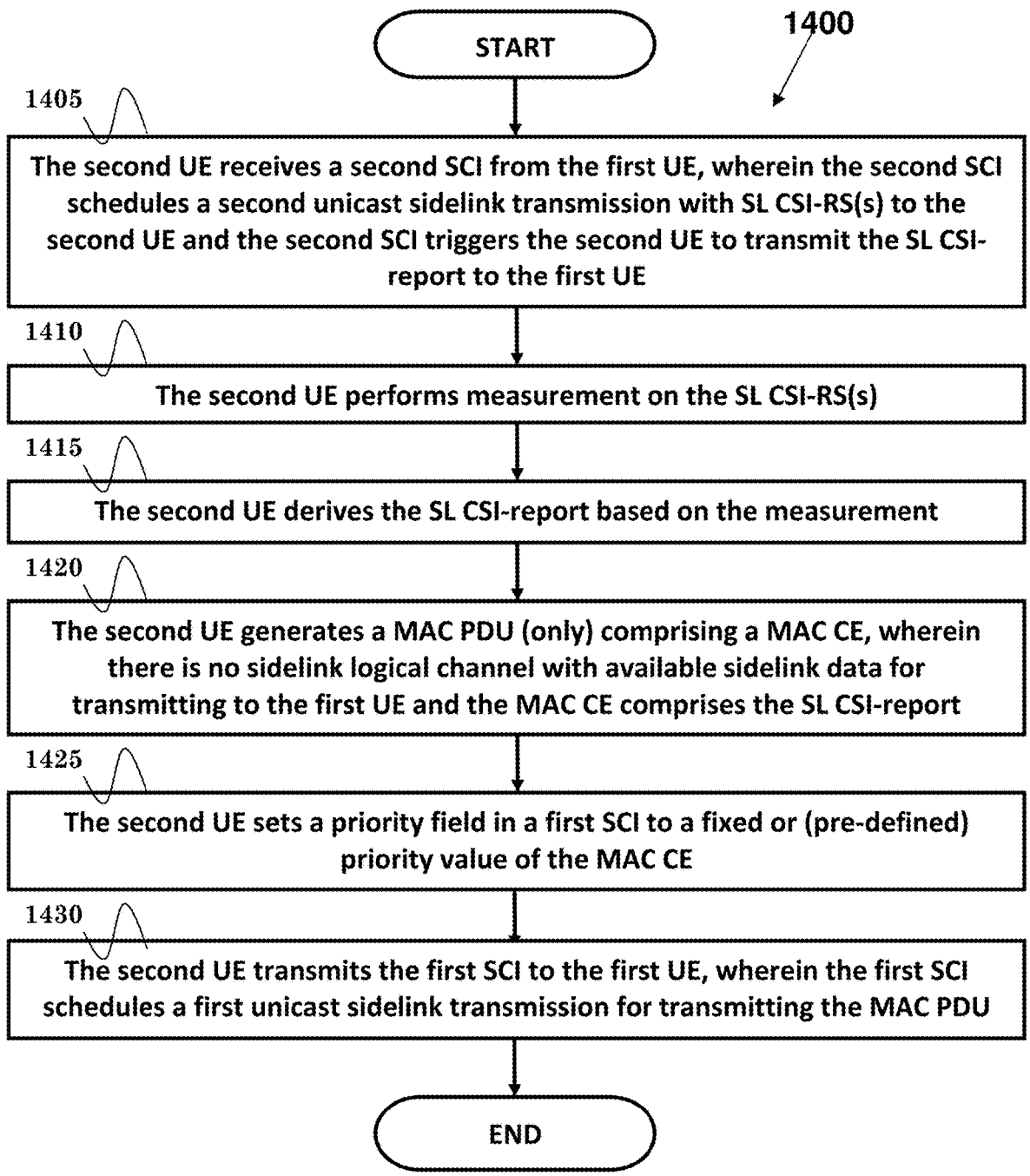
FIG. 14 is a flow chart according to one exemplary embodiment.

FIG. 14 is a flow chart 1400 according to one exemplary embodiment from the perspective of a second UE for transmitting a SL CSI report to a first UE. In step 1405, the second UE receives a second SCI from the first UE, wherein the second SCI schedules a second unicast sidelink transmission with SL CSI-RS(s) to the second UE and the second SCI triggers the second UE to transmit the SL CSI-report to the first UE. In step 1410, the second UE performs measurement on the SL CSI-RS(s). In step 1415, the second UE derives the SL CSI-report based on the measurement. In step 1420, the second UE generates a MAC PDU (only) comprising a MAC CE, wherein there is no sidelink logical channel with available sidelink data for transmitting to the first UE and the MAC CE comprises the SL CSI-report. In step 1425, the second UE sets a priority field in a first SCI to a fixed or (pre-defined) priority value of the MAC CE. In step 1430, the second UE transmits the first SCI to the first UE, wherein the first SCI schedules a first unicast sidelink transmission for transmitting the MAC PDU.

In one embodiment, the MAC PDU (only) comprises the MAC CE and comprises no sidelink data (for transmitting to the first UE). In one embodiment, the SL CSI report could carry at least CQI (Channel Quality Indicator) index and/or RI (Rank Indication) value based on the measurement.

In one embodiment, the second UE could select a resource for the first unicast sidelink transmission based on the fixed or (pre-defined) priority value of the MAC CE and/or a fixed or (pre-defined) first number of sub-channel, the second UE could select one or more candidate resource(s), for selecting a resource for the first unicast sidelink transmission, based on the (pre-defined) priority value of the MAC CE and/or a fixed or (pre-defined) first number of sub-channel, or the second UE could perform sensing and resource selection, for selecting a resource for the first unicast sidelink transmission, based on the (pre-defined) priority value of the MAC CE and/or a fixed or (pre-defined) first number of sub-channel.

In one embodiment, the second UE could select the resource comprising the first number of sub-channels with the priority value of the MAC CE. The first number of sub-channel could be 1. The second UE could disable SL HARQ-ACK feedback or indicates no need of HARQ-ACK feedback in the first SCI.

Referring back to FIGS. 3 and 4, in one exemplary embodiment of a second UE for transmitting a SL CSI report to a first UE. The second UE 300 includes a program code 312 stored in the memory 310. The CPU 308 could execute program code 312 to enable the second UE (i) to receive a second SCI from the first UE, wherein the second SCI schedules a second unicast sidelink transmission with SL CSI-RS(s) to the second UE and the second SCI triggers the second UE to transmit the SL CSI-report to the first UE, (ii) to perform measurement on the SL CSI-RS(s), (iii) to derive the SL CSI-report based on the measurement, (iv) to generate a MAC PDU (only) comprising a MAC CE, wherein there is no sidelink logical channel with available sidelink data for transmitting to the first UE and the MAC CE comprises the SL CSI-report, (v) to set a priority field in a first SCI to a fixed or (pre-defined) priority value of the MAC CE, and (vi) to transmit the first SCI to the first UE, wherein the first SCI schedules a first unicast sidelink transmission for transmitting the MAC PDU. Furthermore, the CPU 308 can execute the program code 312 to perform all of the above-described actions and steps or others described herein.

Figure 15:
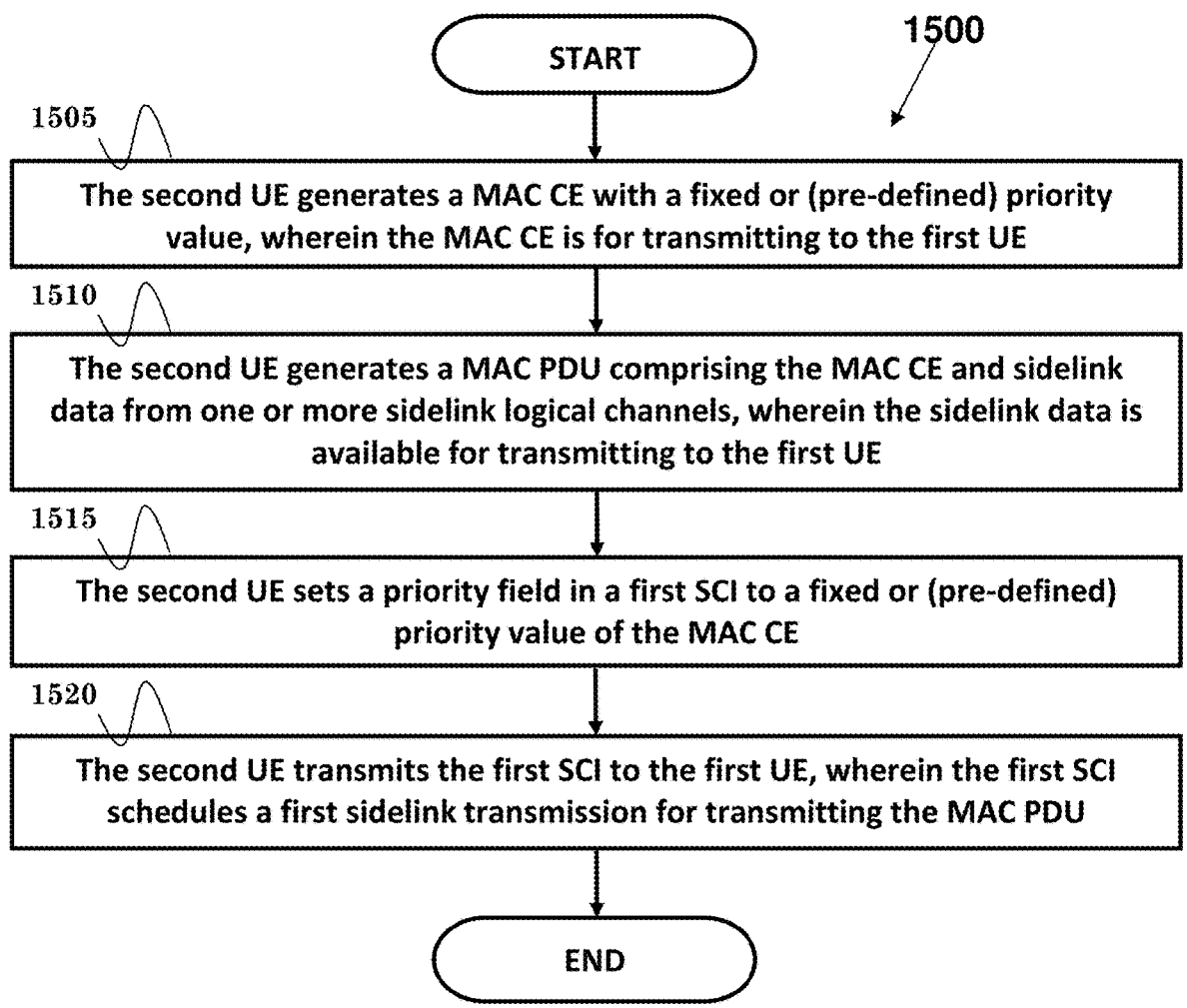
FIG. 15 is a flow chart according to one exemplary embodiment.

FIG. 15 is a flow chart 1500 according to one exemplary embodiment from the perspective of a second UE for performing sidelink transmission to a first UE. In step 1505, the second UE generates a MAC CE with a fixed or (pre-defined) priority value, wherein the MAC CE is for transmitting to the first UE. In step 1510, the second UE generates a MAC PDU comprising the MAC CE and sidelink data from one or more sidelink logical channels, wherein the sidelink data is available for transmitting to the first UE. In step 1515, the second UE sets a priority field in a first SCI to a fixed or (pre-defined) priority value of the MAC CE. In step 1520, the second UE transmits the first SCI to the first UE, wherein the first SCI schedules a first sidelink transmission for transmitting the MAC PDU.

In one embodiment, the second UE could select a resource for the first sidelink transmission based on the (pre-defined) priority value of the MAC CE, or the second UE could select one or more candidate resource(s), for selecting a resource for the first sidelink transmission, based on the (pre-defined) priority value of the MAC CE, or the second UE could perform sensing and resource selection, for selecting a resource for the first sidelink transmission, based on the (pre-defined) priority value of the MAC CE.

In one embodiment, the MAC CE may comprise any of SL CSI report, L1-RSRP report, L3-RSRP report, pathloss report, and beam report.

In one embodiment, when assembling the MAC PDU, the second UE could include (or could store) the MAC CE in the MAC PDU before including the sidelink data; and/or the second UE could prioritize the MAC CE over the sidelink data from one or more sidelink logical channels. If the size of the MAC PDU cannot accommodate the MAC CE and (all) sidelink data available for the first UE, the second UE could include the MAC CE and a part (or none) of the sidelink data available for transmitting to the first UE into the MAC PDU. When or if the MAC PDU comprises the MAC CE and comprises no sidelink data for transmitting to the first UE, the second UE could set the priority field in the first SCI to the fixed or (pre-defined) priority value of the MAC CE.

Referring back to FIGS. 3 and 4, in one exemplary embodiment of a second UE for performing sidelink transmission to a first UE. The second UE 300 includes a program code 312 stored in the memory 310. The CPU 308 could execute program code 312 to enable the second UE (i) to generate a MAC CE with a fixed or (pre-defined) priority value, wherein the MAC CE is for transmitting to the first UE, (ii) to generate a MAC PDU comprising the MAC CE and sidelink data from one or more sidelink logical channels, wherein the sidelink data is available for transmitting to the first UE, (iii) to set a priority field in a first SCI to a fixed or (pre-defined) priority value of the MAC CE, and (iv) to transmit the first SCI to the first UE, wherein the first SCI schedules a first sidelink transmission for transmitting the MAC PDU. Furthermore, the CPU 308 can execute the program code 312 to perform all of the above-described actions and steps or others described herein.

Figure 16:
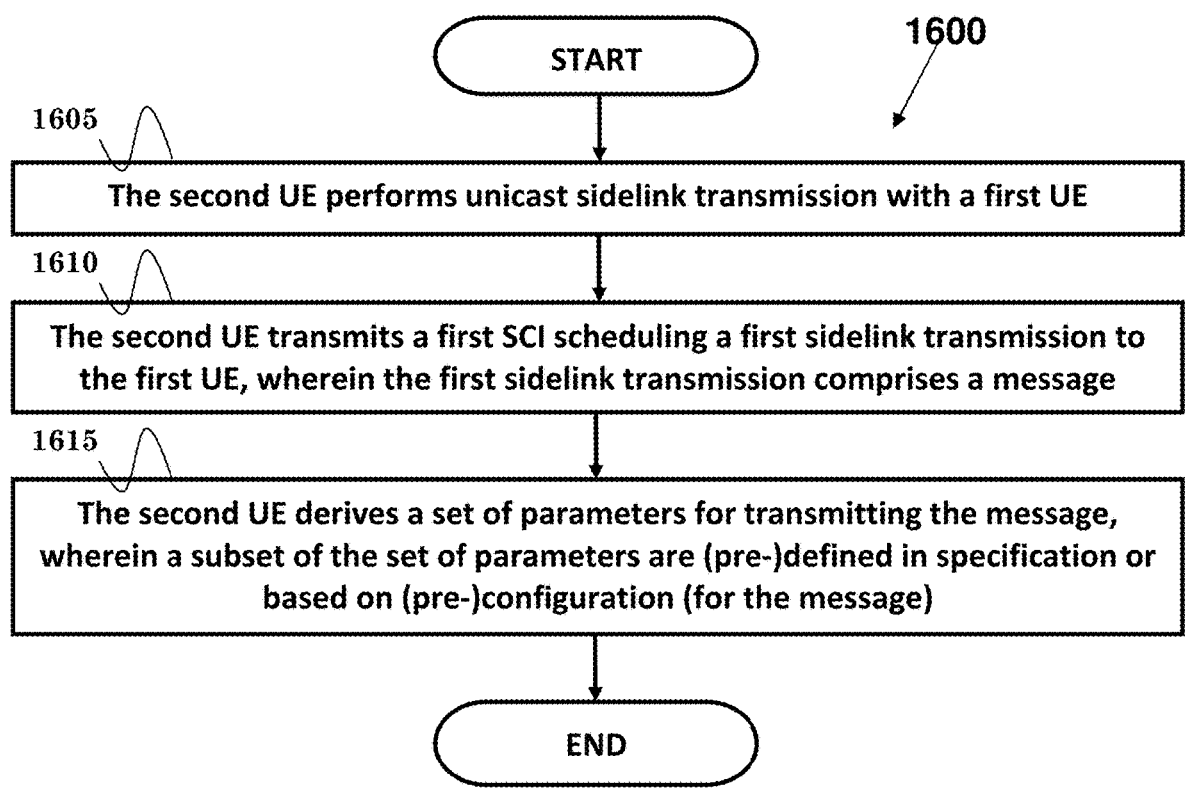
FIG. 16 a flow chart according to one exemplary embodiment.

FIG. 16 is a flow chart 1600 according to one exemplary embodiment from the perspective of a second UE for performing sidelink transmission. In step 1605, the second UE performs unicast sidelink transmission with a first UE. In step 1610, the second UE transmits a first SCI scheduling a first sidelink transmission to the first UE, wherein the first sidelink transmission comprises a message. In step 1615, the second UE derives a set of parameters for transmitting the message, wherein a subset of the set of parameters are (pre-)defined in specification or based on (pre-)configuration (for the message).

In one embodiment, the set of parameters may comprise or indicate a priority indication or level, a MCS value, a first number of sub-channel for frequency resource of the first sidelink transmission, a second number for indicating amount of retransmission number and initial transmission for transmitting the message. The first SCI may indicate all or a subset of the set of parameters. The (pre-)configuration for the message could be per resource pool, per carrier, per SL BWP, per unicast link, or per SL UE pair.

In one embodiment, the second UE could derive the priority indication associated to priority level associated to the lowest or highest CR value. The second UE could also derive the priority indication (in the first SCI) associated to priority level in the most recent sidelink transmission to the first UE. Furthermore, the second UE could derive the priority indication associated to priority level indicated by a second SCI.

In one embodiment, the second SCI could schedule a second sidelink transmission. The second SCI could indicate a priority level for the second sidelink transmission. The second SCI could indicate or trigger the second UE to transmit the message.

In one embodiment, the second UE could derive the priority level for the message based on the priority level indicated in the second SCI. The second UE could also derive the priority indication (implicitly) associated with time duration and/or a reference priority level.

In one embodiment, for the group, the second UE could transmit, derive, or generate a NACK indication when the second UE does not decode the groupcast sidelink transmission successfully. Alternatively, for the group, the second UE may not transmit or may not generate HARQ-ACK for transmission or the second UE fail decode the first SCI, when the second UE decode the groupcast sidelink transmission successfully. The second sidelink transmission (or the second SCI) could indicate or trigger the second device to perform measurement on sidelink CSI-RS in the second sidelink transmission.

In one embodiment, the message could carry at least CQI index and/or RI value based on a measured result. The message may comprise CSI report and/or SL RSRP report.

In one embodiment, the first sidelink transmission may not contain TB or data packet. If the first sidelink transmission comprises the message only and without TB or data packet, the second device could derive priority indication in the first SCI based on (pre-) configuration for the message or priority level associated to lowest or highest CR value or priority level in the most recent sidelink transmission to the first UE or priority level indicated by the second SCI.

In one embodiment, the second UE could select the second number of candidate resource for transmitting the message. The second UE could transmit the second number of candidate resource for the message. The second UE could transmit in multiple times on the second number of candidate resource. The second number of candidate resource could be in a different slot in a sidelink resource pool. The first sidelink transmission could be transmitted via one of the second number of candidate resource. The second device could derive a CR value for a priority level via not taking account the first sidelink transmission.

Referring back to FIGS. 3 and 4, in one exemplary embodiment of a second UE for performing sidelink transmission. The second UE 300 includes a program code 312 stored in the memory 310. The CPU 308 could execute program code 312 to enable the second UE (i) to perform unicast sidelink transmission with a first UE, (iii) to transmit a first SCI scheduling a first sidelink transmission to the first UE, wherein the first sidelink transmission comprises a message, and (ii) to derive a set of parameters for transmitting the message, wherein a subset of the set of parameters are (pre-)defined in specification or based on (pre-)configuration (for the message). Furthermore, the CPU 308 can execute the program code 312 to perform all of the above-described actions and steps or others described herein.

FIG. 17 is a flow chart 1700 according to one exemplary embodiment from the perspective of a UE. In step 1705, the UE obtains a SL grant, wherein the UE performs a SL transmission to a second UE based on the SL grant. In step 1710, the UE generates a MAC Control element (CE), wherein the MAC CE is associated with the second UE. In step 1715, the UE obtains SL data from one or more SL logical channels, wherein the SL data is associated with the second UE. In step 1720, the UE determines whether to include the MAC CE in a TB before the SL data based on a type of the MAC CE, wherein the TB is generated in response to the SL grant. In step 1725, the UE transmits the TB to the second UE via sidelink.

In one embodiment, the UE may include the MAC CE in the TB before the SL data if the type of the MAC CE is CSI report MAC CE. Alternatively, the UE may not include the MAC CE in the TB before the SL data if the type of the MAC CE is CSI report MAC CE.

In one embodiment, the UE may include the MAC CE in the TB before the SL data if the type of the MAC CE is RSRP report MAC CE. Alternatively, the UE may not include the MAC CE in the TB before the SL data if the type of the MAC CE is RSRP report MAC CE.

In one embodiment, the UE could determine whether to include the MAC CE in the TB before the SL data further based on priority associated with the one or more SL logical channels. The UE may include the MAC CE into the TB before the SL data if priority of the one or more SL logical channels associated with the SL data is higher than a threshold. Alternatively, the UE may not include the MAC CE into the TB before the SL data if priority of the one or more SL logical channels associated with the SL data is lower than a threshold. The threshold could be configured by a base station.

Referring back to FIGS. 3 and 4, in one exemplary embodiment of a UE. The UE 300 includes a program code 312 stored in the memory 310. The CPU 308 could execute program code 312 to enable the UE (i) to obtain a SL grant, wherein the UE performs a SL transmission to a second UE based on the SL grant, (ii) to generate a MAC CE, wherein the MAC CE is associated with the second UE, (iii) to obtain SL data from one or more SL logical channels, wherein the SL data is associated with the second UE, (iv) to determine whether to include the MAC CE in a TB before the SL data based on a type of the MAC CE, wherein the TB is generated in response to the SL grant, and (v) to transmit the TB to the second UE via sidelink. Furthermore, the CPU 308 can execute the program code 312 to perform all of the above-described actions and steps or others described herein.

Figure 18:
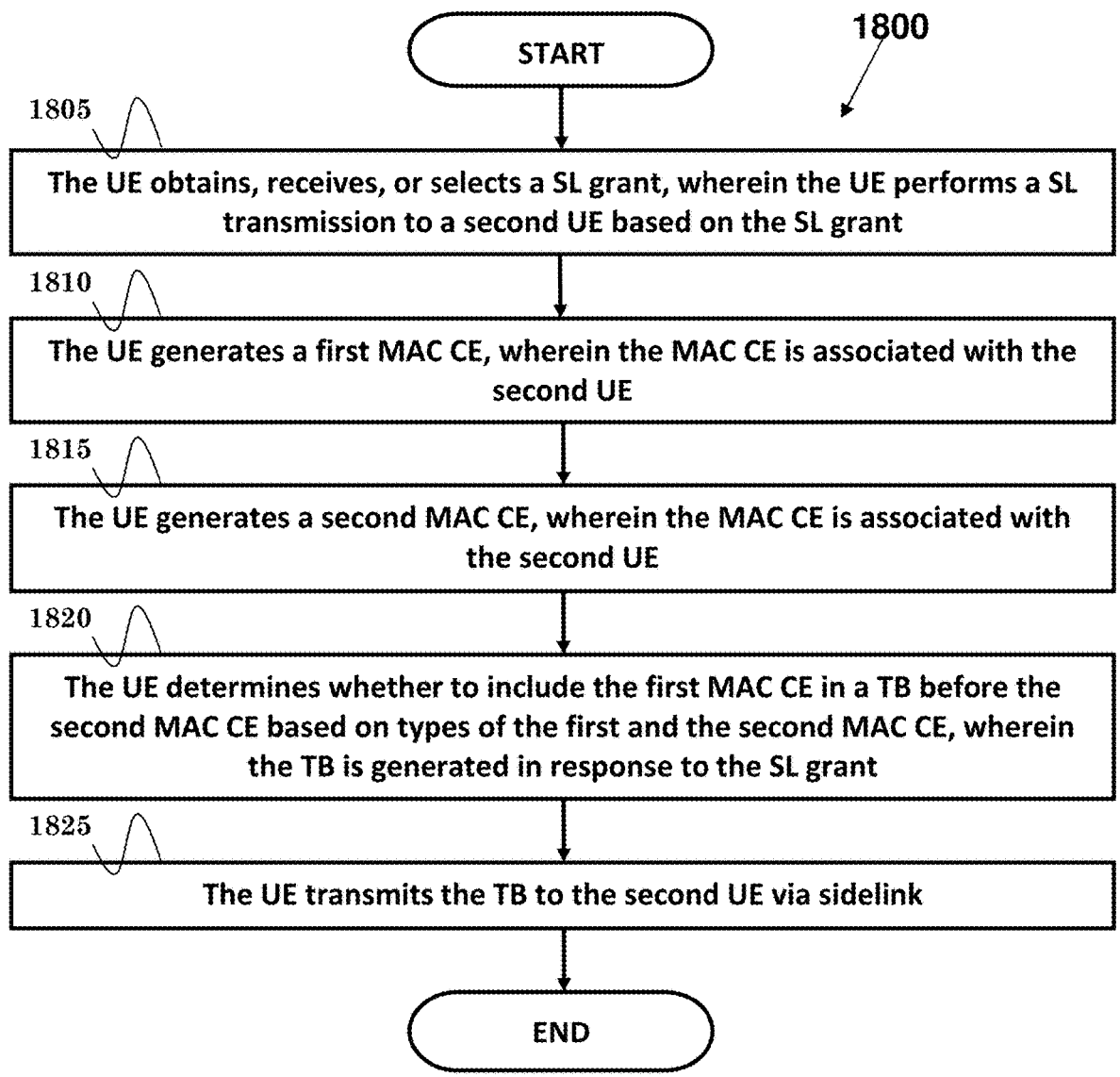
FIG. 18 is a flow chart according to one exemplary embodiment.

FIG. 18 is a flow chart 1800 according to one exemplary embodiment from the perspective of a UE. In step 1805, the UE obtains, receives, or selects a SL grant, wherein the UE performs a SL transmission to a second UE based on the SL grant. In step 1810, the UE generates a first MAC CE, wherein the MAC CE is associated with the second UE. In step 1815, the UE generates a second MAC CE, wherein the MAC CE is associated with the second UE. In step 1820, the UE determines whether to include the first MAC CE in a TB before the second MAC CE based on types of the first and the second MAC CE, wherein the TB is generated in response to the SL grant. In step 1825, the UE transmits the TB to the second UE via sidelink.

In one embodiment, the UE may include the first MAC CE before the second MAC CE if the first MAC CE is a CSI report MAC CE and the second MAC CE is not a CSI report MAC CE. The UE may also include the first MAC CE before the second MAC CE if the first MAC CE is a RSRP report MAC CE and the second MAC CE is not a RSRP report MAC CE. The MAC CE could be a CSI report MAC CE for the second UE, or a L1-RSRP report MAC CE for the second UE. The MAC CE could be transmitted via sidelink.

In one embodiment, the UE could obtain the SL grant via autonomous resource reselection mode, or via a base station.

Referring back to FIGS. 3 and 4, in one exemplary embodiment of a UE. The UE 300 includes a program code 312 stored in the memory 310. The CPU 308 could execute program code 312 to enable the UE (i) to obtain, receive, or select a SL grant, wherein the UE performs a SL transmission to a second UE based on the SL grant, (ii) to generate a first MAC CE, wherein the MAC CE is associated with the second UE, (iii) to generate a second MAC CE, wherein the MAC CE is associated with the second UE, (iv) to determine whether to include the first MAC CE in a TB before the second MAC CE based on types of the first and the second MAC CE, wherein the TB is generated in response to the SL grant, or (v) to transmit the TB to the second UE via sidelink. Furthermore, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a second UE (User Equipment) for transmitting a SL CSI (Sidelink Channel State Information)-report to a first UE, comprising:

the second UE receives a second SCI (Sidelink Control Information) from the first UE, wherein the second SCI schedules a second unicast sidelink transmission with SL CSI-RS(s) (Sidelink Channel State Information-Reference Signal(s)) to the second UE and the second SCI triggers the second UE to transmit the SL CSI-report to the first UE;

the second UE performs measurement on the SL CSI-RS(s);

the second UE derives the SL CSI-report based on the measurement;

the second UE generates a MAC PDU (Medium Access Control Protocol Data Unit) comprising a MAC CE (Control Element) and sidelink data from one or more sidelink logical channels, wherein the sidelink data is available for transmitting to the first UE and the MAC CE comprises the SL CSI-report, wherein when the size of the MAC PDU cannot accommodate the MAC CE and all sidelink data available for the first UE, the second UE includes the MAC CE and a part of the sidelink data available for transmitting to the first UE into the MAC PDU;

the second UE sets a priority field in a first SCI to a fixed or (pre-defined) priority value of the MAC CE; and the second UE transmits the first SCI to the first UE, wherein the first SCI schedules a first unicast sidelink transmission for transmitting the MAC PDU.

2. The method of claim 1, wherein the second UE selects a resource for the first unicast sidelink transmission based on the (pre-defined) priority value of the MAC CE, or the second UE selects one or more candidate resource(s), for selecting a resource for the first unicast sidelink transmission, based on the (pre-defined) priority value of the MAC CE, or the second UE performs sensing and resource selection, for selecting a resource for the first unicast sidelink transmission, based on the (pre-defined) priority value of the MAC CE.

3. The method of claim 1, wherein the SL CSI report carries at least CQI (Channel Quality Indicator) index and/or RI (Rank Indication) value based on the measurement.

4. The method of claim 1, wherein when assembling the MAC PDU, the second UE includes (or stores) the MAC CE in the MAC PDU before including the sidelink data, and/or the second UE prioritizes the MAC CE over the sidelink data from one or more sidelink logical channels.

5. The method of claim 1, wherein regardless of whether the MAC PDU comprises the sidelink data, the second UE sets the priority field in the first SCI to the fixed or (pre-defined) priority value of the MAC CE.

6. A method of a second UE (User Equipment) for transmitting a SL CSI (Sidelink Channel State Information)-report to a first UE, comprising:

the second UE receives a second SCI (Sidelink Control Information) from the first UE, wherein the second SCI schedules a second unicast sidelink transmission with SL CSI-RS(s) (Sidelink Channel State Information-Reference Signal(s)) to the second UE and the second SCI triggers the second UE to transmit the SL CSI-report to the first UE;

the second UE performs measurement on the SL CSI-RS(s);

the second UE derives the SL CSI-report based on the measurement;

the second UE generates a MAC PDU (Medium Access Control Protocol Data Unit) (only) comprising a MAC CE (Control Element), wherein there is no sidelink logical channel with available sidelink data for transmitting to the first UE and the MAC CE comprises the SL CSI-report;

the second UE sets a priority field in a first SCI to a fixed or (pre-defined) priority value of the MAC CE;

the second UE disables SL HARQ-ACK (Hybrid Automatic Repeat Request-Acknowledgement) feedback or indicates no need of HARQ-ACK feedback in the first SCI; and the second UE transmits the first SCI to the first UE, wherein the first SCI schedules a first unicast sidelink transmission for transmitting the MAC PDU.

7. The method of claim 6, wherein the SL CSI report carries at least CQI (Channel Quality Indicator) index and/or RI (Rank Indication) value based on the measurement.

8. The method of claim 6, wherein the second UE selects a resource for the first unicast sidelink transmission based on the fixed or (pre-defined) priority value of the MAC CE and/or a fixed or (pre-defined) first number of sub-channel, or the second UE selects one or more candidate resource(s), for selecting a resource for the first unicast sidelink transmission, based on the (pre-defined) priority value of the MAC CE and/or a fixed or (pre-defined) first number of sub-channel, or the second UE performs sensing and resource selection, for selecting a resource for the first unicast sidelink transmission, based on the (pre-defined) priority value of the MAC CE and/or a fixed or (pre-defined) first number of sub-channel.

9. The method of claim 8, wherein the second UE selects the resource comprising the first number of sub-channels with the priority value of the MAC CE.

10. The method of claim 8, wherein the first number of sub-channel is 1.

11. A method of a second UE (User Equipment) for performing sidelink transmission to a first UE, comprising:

the second UE generates a MAC (Medium Access Control) CE (Control Element) with a fixed or (pre-defined) priority value, wherein the MAC CE is for transmitting to the first UE;

the second UE generates a MAC PDU (Protocol Data Unit) comprising the MAC CE and sidelink data from one or more sidelink logical channels, wherein the sidelink data is available for transmitting to the first UE, wherein when the size of the MAC PDU cannot accommodate the MAC CE and all sidelink data available for the first UE, the second UE includes the MAC CE and a part of the sidelink data available for transmitting to the first UE into the MAC PDU;

the second UE sets a priority field in a first SCI to a fixed or (pre-defined) priority value of the MAC CE; and the second UE transmits the first SCI to the first UE, wherein the first SCI schedules a first sidelink transmission for transmitting the MAC PDU.

12. The method of claim 11, wherein the second UE selects a resource for the first sidelink transmission based on the (pre-defined) priority value of the MAC CE, or the second UE selects one or more candidate resource(s), for selecting a resource for the first sidelink transmission, based on the (pre-defined) priority value of the MAC CE, or the second UE performs sensing and resource selection, for selecting a resource for the first sidelink transmission, based on the (pre-defined) priority value of the MAC CE.

13. The method of claim 11, wherein the MAC CE comprises any of SL CSI (Sidelink Channel State Information) report, L1-RSRP (Layer 1-Reference Signal Received Power) report, L3-RSRP (Layer 3-Reference Signal Received Power) report, pathloss report, and beam report.

14. The method of claim 11, wherein when assembling the MAC PDU, the second UE includes (or stores) the MAC CE in the MAC PDU before including the sidelink data; and/or the second UE prioritizes the MAC CE over the sidelink data from one or more sidelink logical channels.

15. The method of claim 11, when or if the MAC PDU comprises the MAC CE and comprises no sidelink data for transmitting to the first UE, the second UE sets the priority field in the first SCI to the fixed or (pre-defined) priority value of the MAC CE.

16. A second UE (User Equipment) for transmitting a SL CSI (Sidelink Channel State Information)-report to a first UE, comprising:

a control circuit;
a processor installed in the control circuit; and
a memory installed in the control circuit and operatively coupled to the processor;
wherein the processor is configured to execute a program code stored in the memory to:
  receive a second SCI (Sidelink Control Information) from the first UE, wherein the second SCI schedules a second unicast sidelink transmission with SL CSI-RS(s) (Sidelink Channel State Information-Reference Signal(s)) to the second UE and the second SCI triggers the second UE to transmit the SL CSI-report to the first UE;
  perform measurement on the SL CSI-RS(s);
  derive the SL CSI-report based on the measurement;
  generate a MAC PDU (Medium Access Control Protocol Data Unit) comprising a MAC CE (Control Element) and sidelink data from one or more sidelink logical channels, wherein the sidelink data is available for transmitting to the first UE and the MAC CE comprises the SL CSI-report, wherein when the size of the MAC PDU cannot accommodate the MAC CE and all sidelink data available for the first UE, the second UE includes the MAC CE and a part of the sidelink data available for transmitting to the first UE into the MAC PDU;
  set a priority field in a first SCI to a fixed or (pre-defined) priority value of the MAC CE; and
  transmit the first SCI to the first UE, wherein the first SCI schedules a first unicast sidelink transmission for transmitting the MAC PDU.

* * * * *